United States Patent
Li et al.

(10) Patent No.: US 10,863,399 B2
(45) Date of Patent: Dec. 8, 2020

(54) PREDICTIVE BEAMFORMING AND SUBARRAY SELECTION

(71) Applicant: QUALCOMM Incorporated, San Diego, CA (US)

(72) Inventors: Junyi Li, Chester, NJ (US); Ashwin Sampath, Skillman, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/925,423

(22) Filed: Mar. 19, 2018

(65) Prior Publication Data
US 2018/0324657 A1 Nov. 8, 2018

Related U.S. Application Data

(60) Provisional application No. 62/501,671, filed on May 4, 2017.

(51) Int. Cl.
*H04L 27/00* (2006.01)
*H04B 7/04* (2017.01)
(Continued)

(52) U.S. Cl.
CPC ...... *H04W 36/0083* (2013.01); *H04B 7/0408* (2013.01); *H04B 7/0413* (2013.01);
(Continued)

(58) Field of Classification Search
CPC ... H04W 36/0083; H04W 8/02; H04W 56/00; H04W 16/28; H04W 48/16;
(Continued)

(56) References Cited

U.S. PATENT DOCUMENTS

| 6,690,917 B2 | 2/2004 | Soliman et al. |
| 8,150,063 B2 | 4/2012 | Chen et al. |

(Continued)

FOREIGN PATENT DOCUMENTS

| WO | 2015183472 A1 | 12/2015 |
| WO | 2016180497 A1 | 11/2016 |

(Continued)

OTHER PUBLICATIONS

International Search Report and Written Opinion—PCT/US2018/023202—ISA/EPO—dated Jul. 3, 2018.

*Primary Examiner* — Pablo N Tran
(74) *Attorney, Agent, or Firm* — Arent Fox, LLP

(57) ABSTRACT

A wireless device of the present disclosure may be able to reduce the time needed to determine a subarray and/or beamforming direction used for mmW communication. An apparatus may maintain first information associated with a correlation between each of a plurality of wireless device orientations and a plurality of nodes, at least one subarray, and a corresponding beamforming direction. The apparatus may communicate with a first node using a first beamforming direction selected from the first information. In certain aspects, the first beamforming direction may be correlated with a first orientation of a first subarray at the wireless device and the first node. The apparatus may perform a handoff procedure from the first node to a second node when a position of the first subarray changes from the first orientation to a second orientation.

30 Claims, 21 Drawing Sheets

(51) Int. Cl.
*H01Q 1/00* (2006.01)
*H04B 7/08* (2006.01)
*H04W 8/02* (2009.01)
*H04W 36/00* (2009.01)
*H04B 7/0413* (2017.01)
*H04B 7/06* (2006.01)
*H04B 7/0408* (2017.01)
*H04W 36/30* (2009.01)
*H04L 25/03* (2006.01)

(52) U.S. Cl.
CPC ......... *H04B 7/0617* (2013.01); *H04B 7/0691* (2013.01); *H04B 7/0695* (2013.01); *H04W 36/30* (2013.01); *H04L 2025/03414* (2013.01)

(58) Field of Classification Search
CPC .. H04B 7/0408; H04B 7/0413; H04B 7/0617; H04B 7/0691; H04B 7/0695; H04B 7/04; H04B 7/08; H04B 7/06; H04L 2025/03414; H04L 27/00; H01Q 1/00
See application file for complete search history.

(56) References Cited

U.S. PATENT DOCUMENTS

| | | | |
|---|---|---|---|
| 8,525,868 B2* | 9/2013 | Forutanpour | H04R 3/005 348/14.01 |
| 9,331,760 B2* | 5/2016 | El Ayach | H04B 7/0456 |
| 9,516,563 B2 | 12/2016 | Maltsev et al. | |
| 2012/0064841 A1* | 3/2012 | Husted | H01Q 21/205 455/78 |
| 2012/0172096 A1* | 7/2012 | Samardzija | H01Q 1/246 455/575.7 |
| 2012/0185246 A1* | 7/2012 | Zhang | G10L 21/0208 704/226 |
| 2015/0141026 A1* | 5/2015 | Jover | H04K 3/224 455/452.1 |

FOREIGN PATENT DOCUMENTS

| | | | | |
|---|---|---|---|---|
| WO | 2017078591 A1 | 5/2017 | | |
| WO | WO-2018013026 A1 * | 1/2018 | ............ | G01S 19/29 |
| WO | WO-2018017840 A1 * | 1/2018 | .......... | H04W 72/046 |

\* cited by examiner

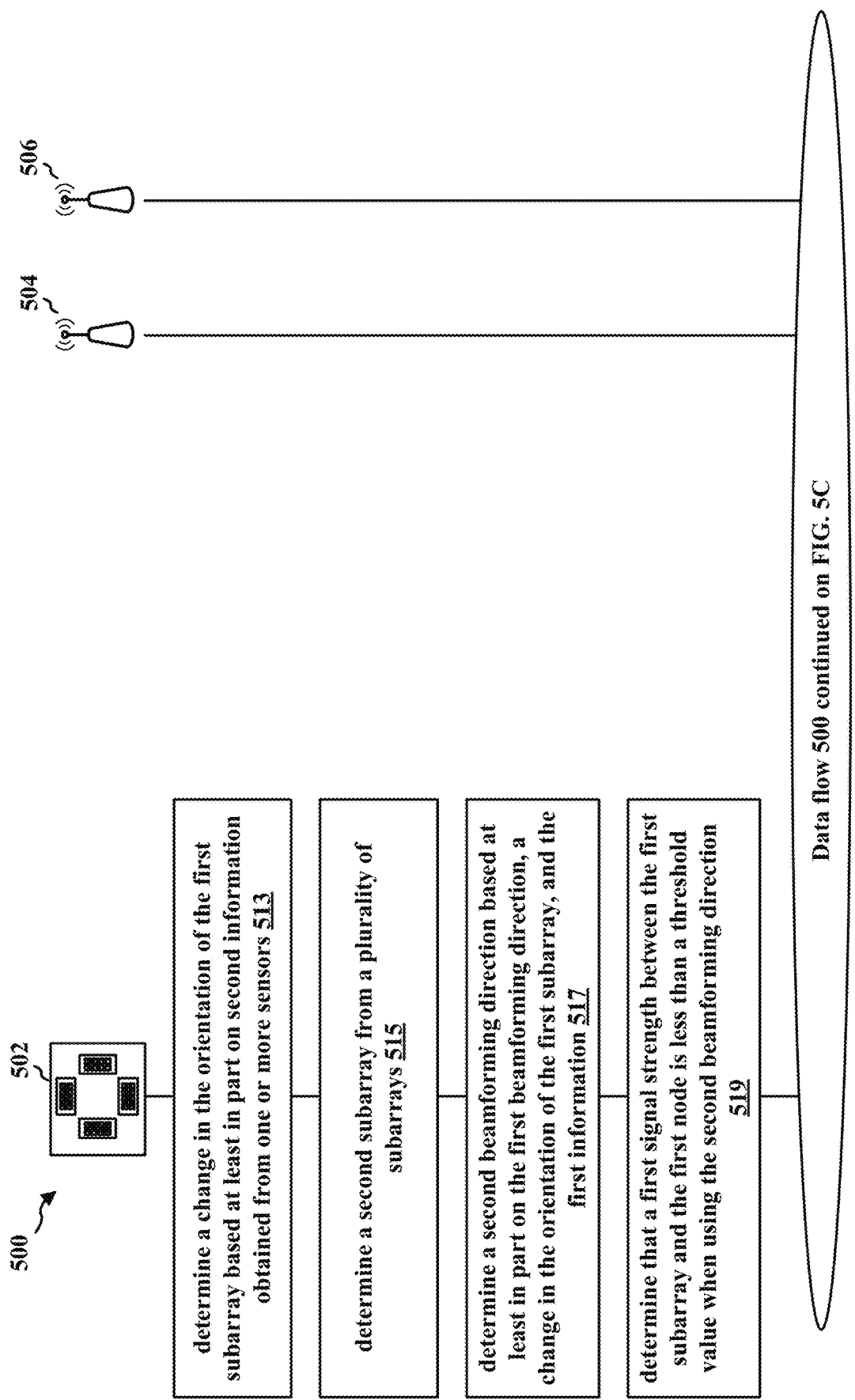

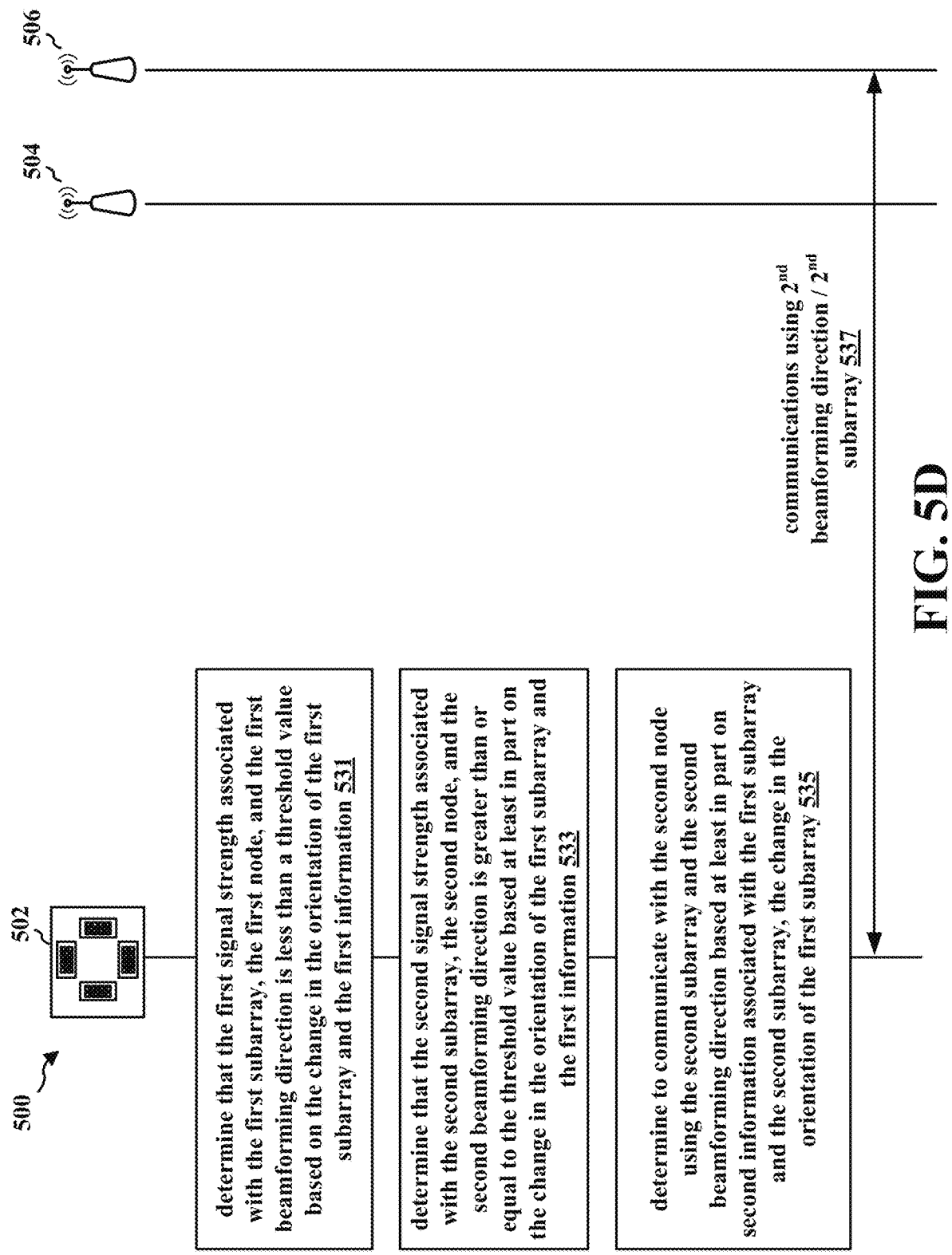

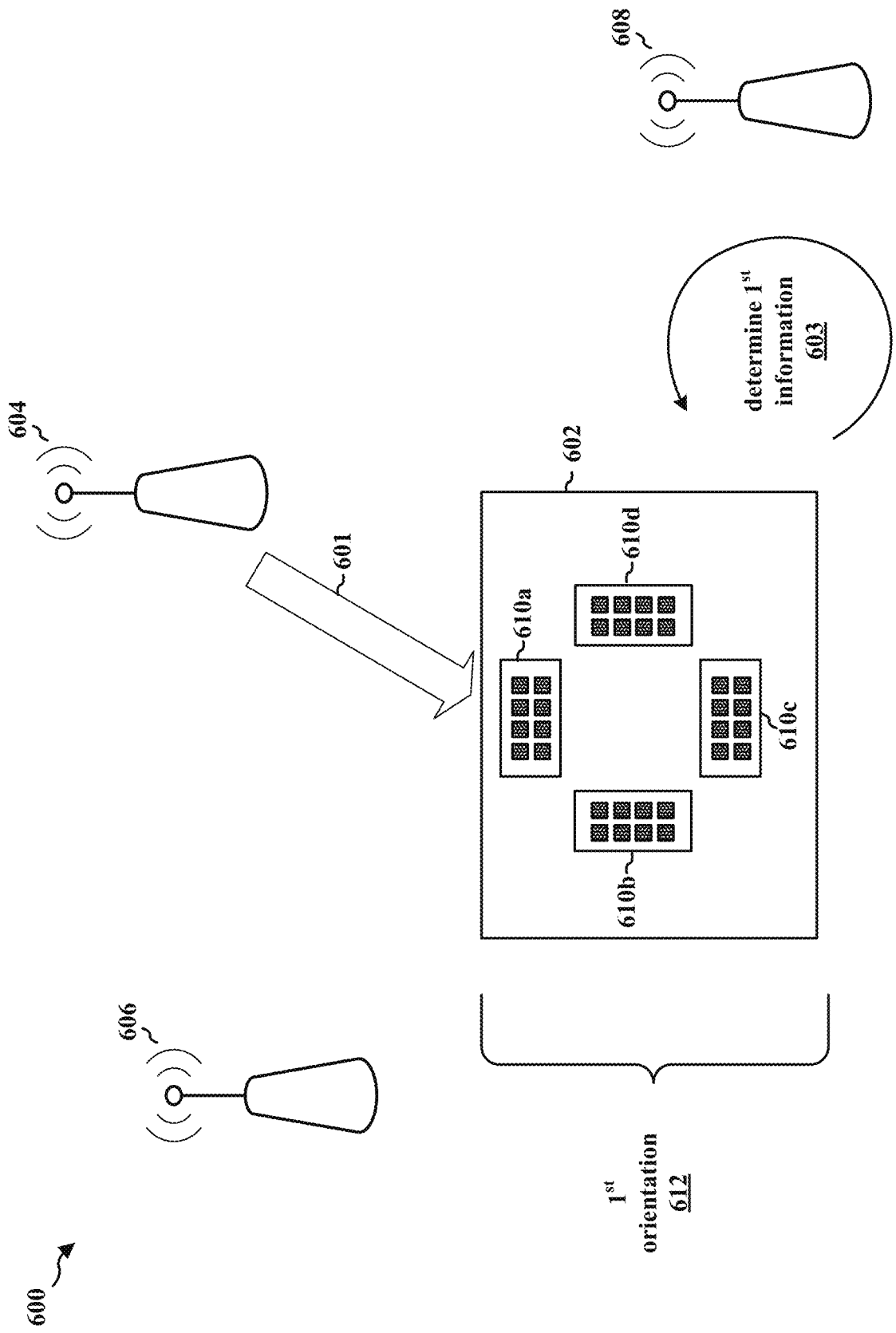

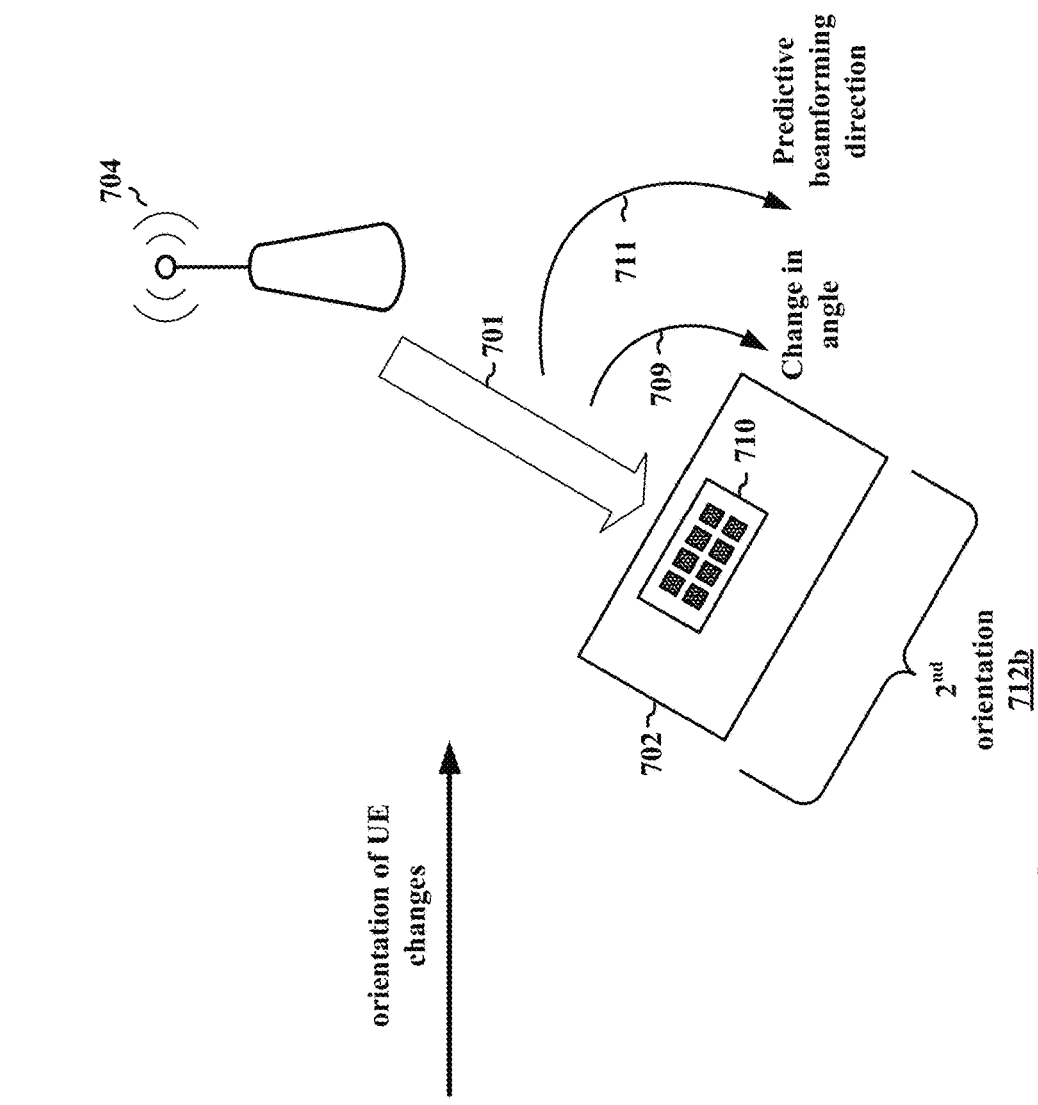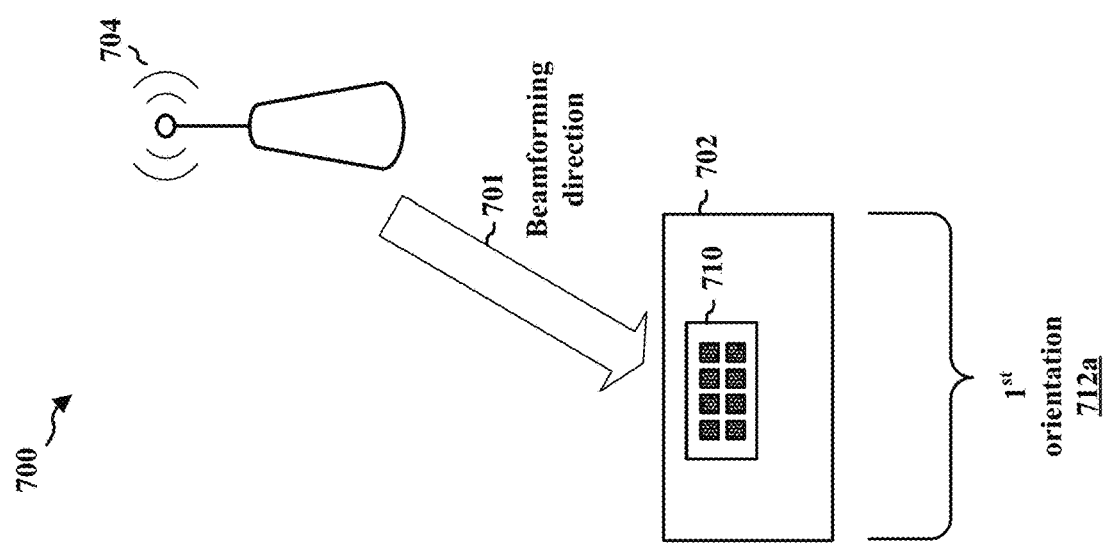
FIG. 7

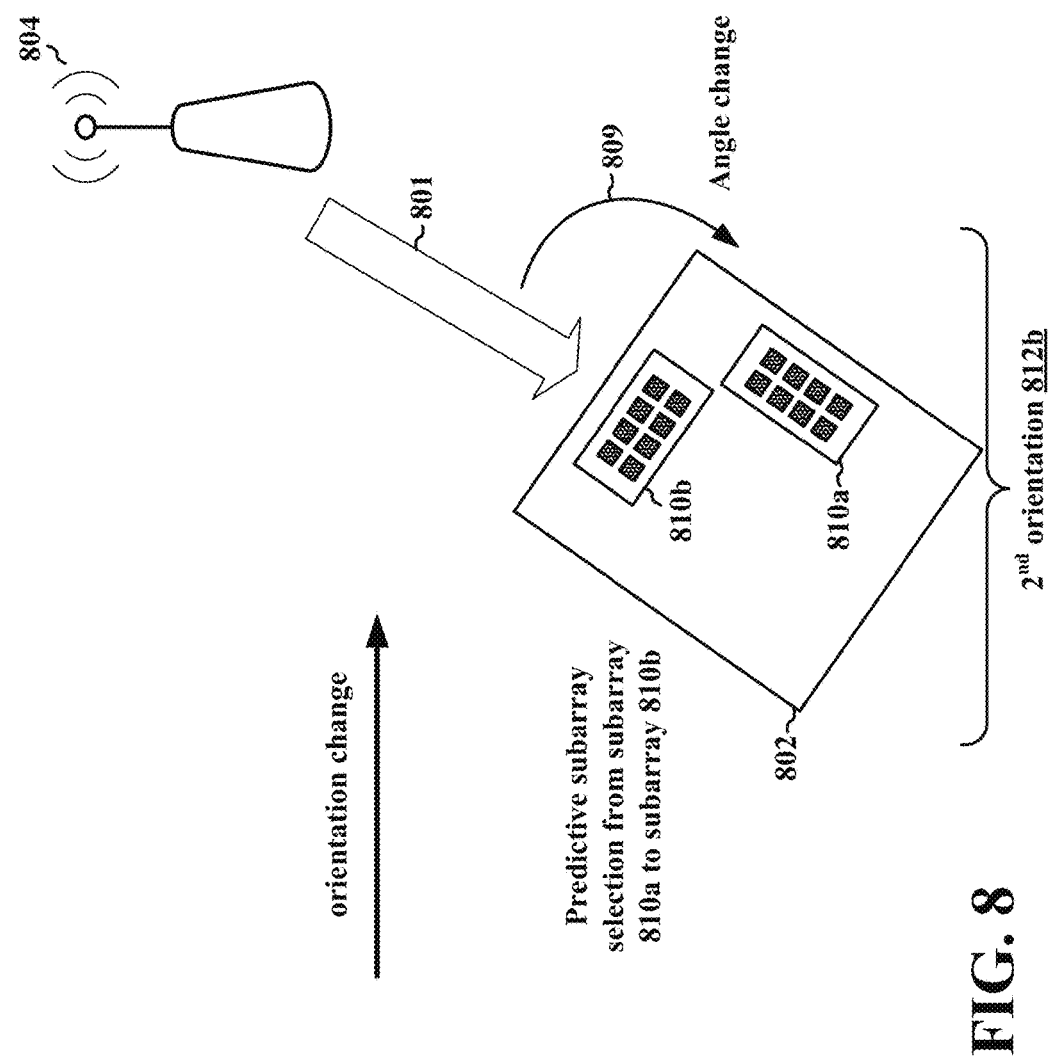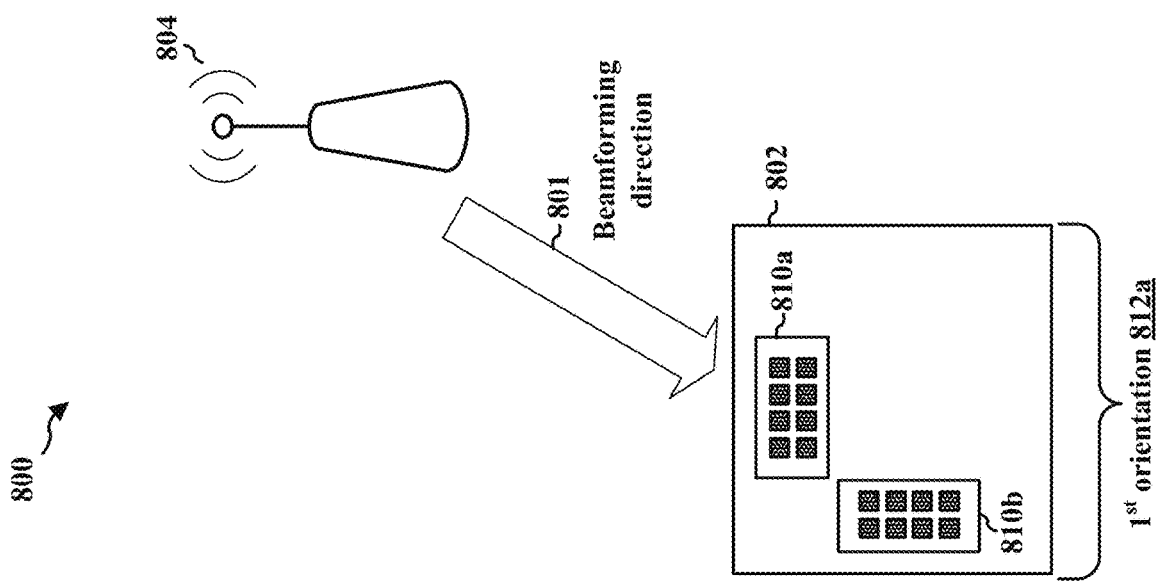
FIG. 8

PREDICTIVE BEAMFORMING AND SUBARRAY SELECTION

CROSS-REFERENCE TO RELATED APPLICATION(S)

This application claims the benefit of U.S. Provisional Application Ser. No. 62/501,671, entitled "PREDICTIVE BEAMFORMING AND/OR SUBARRAY SELECTION" and filed on May 4, 2017, which is expressly incorporated by reference herein in its entirety.

BACKGROUND

Field

The present disclosure relates generally to communication systems, and more particularly, to predictive beamforming and/or predictive subarray selection based on a change in orientation while a wireless device is in operational mode.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

One way to meet the increasing demand for mobile broadband may be to utilize the millimeter wave (mmW) spectrum in addition to LTE. Communications using the mmW spectrum may experience extremely high path loss and a short range. Beamforming may be used to compensate for the high path loss and short range. However, due to the potentially large number of antennas at an mmW node (e.g., mmW base station, mmW access point (AP), etc.) and subarrays at a wireless device, the number of possible beamforming directions that may need to be scanned during a beamforming procedure can be quite large. A scanning process for a large number of potential beamforming directions may take an undesirable amount of time and create significant beam overhead.

Thus, there is a need for a technique that reduces the time needed to determine a subarray and/or beamforming direction used for mmW communication and that reduces the amount of beam overhead.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One way to meet the increasing demand for mobile broadband may be to utilize the mmW spectrum in addition to LTE. Communications using the mmW spectrum may experience extremely high path loss and a short range. Beamforming may be used to compensate for the high path loss and short range. For example, a virtual reality (VR) device may be equipped with multiple subarrays of mmW antennas for receiving signals from an mmW node.

However, due to the potentially large number of antennas at an mmW node (e.g., mmW base station, mmW AP, etc.) and subarrays of mmW antennas at a wireless device (e.g., a user equipment (UE), VR wireless device, STA, cell phone, smart phone, etc.), the number of possible beamforming directions that may need to be scanned during a beamforming procedure can be quite large. For example, a wireless device may connect to a serving mmW node, and one or multiple subarrays at the wireless device may be beamformed with the serving mmW node prior to initiating mmW communications. A scanning process for a large number of potential beamforming directions may take an undesirable amount of time and create significant beam overhead.

Thus, there is a need for a technique that reduces the time needed to determine a subarray and/or beamforming direction used for mmW communication and that reduces the amount of beam overhead.

The present disclosure provides a solution by enabling a wireless device to maintain beamforming calibration information that includes a correlation between at least one of a plurality of wireless device positions and/or wireless device orientations, and at least one mmW node, at least one mmW subarray at the wireless device, and a corresponding beamforming direction associated with at least one of a particular position and/or orientation of the wireless device. Using information obtained with sensors located at the wireless device, the wireless device may be able to determine the position and/or orientation of the wireless device. The wireless device may then use the beamforming calibration information to select at least one of a beamforming direction, an mmW subarray, and/or an mmW node based on the determined orientation without performing a scanning process for each of the possible beamforming directions.

Consequently, a wireless device of the present disclosure may be able to reduce the time needed to determine a subarray and/or beamforming direction to use for mmW communication and reduce the amount of beam overhead.

In an aspect of the disclosure, a method, a computer-readable medium, and an apparatus are provided. The apparatus may maintain first information associated with a correlation between each of a plurality of wireless device orientations and a plurality of nodes, at least one subarray, and a corresponding beamforming direction. The apparatus may communicate with a first node using a first beamforming direction selected from the first information. In certain aspects, the first beamforming direction may be correlated with a first orientation of a first subarray at the wireless device and the first node. The apparatus may perform a handoff procedure from the first node to a second node when a position of the first subarray changes from the first orientation to a second orientation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A-5D illustrate a data flow between a wireless device and a plurality of nodes in accordance with certain aspects of the disclosure.

FIG. 6 illustrates a beamforming procedure in accordance with certain aspects of the disclosure.

FIG. 7 illustrates a predictive beamforming procedure and/or a predictive subarray selection procedure in accordance with certain aspects of the disclosure.

FIG. 8 illustrates a predictive beamforming procedure and/or a predictive subarray selection procedure in accordance with certain aspects of the disclosure.

DETAILED DESCRIPTION

Figure 1:
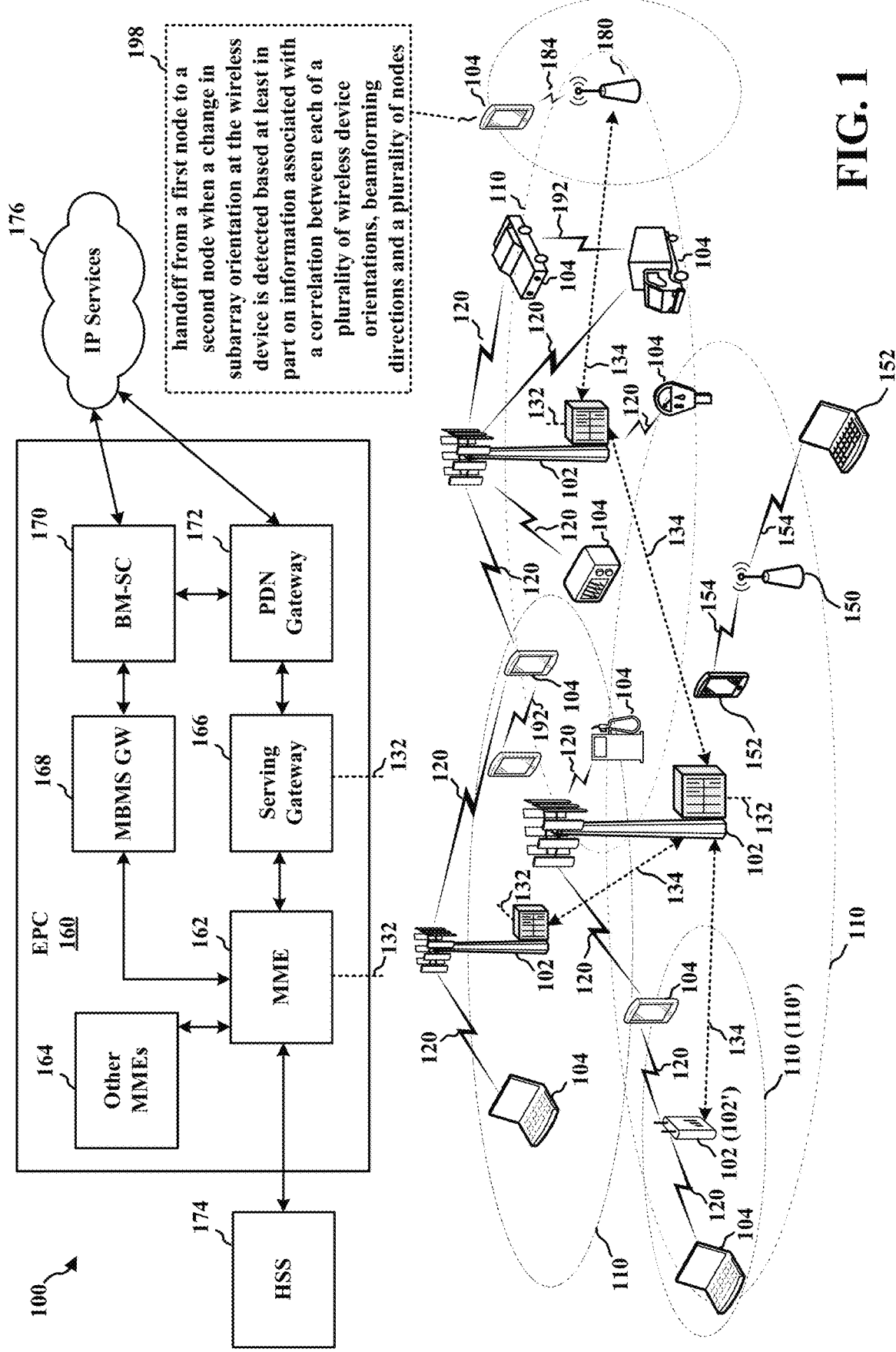
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a wireless device such as the UE 104/STA 152 may be configured to handoff from a first node to a second node when a change in subarray orientation at the wireless device is detected based at least in part on information associated with a correlation between each of a plurality of wireless device orientations and at least one node, at least one subarray, and a corresponding beamforming direction (198).

Figure 2:
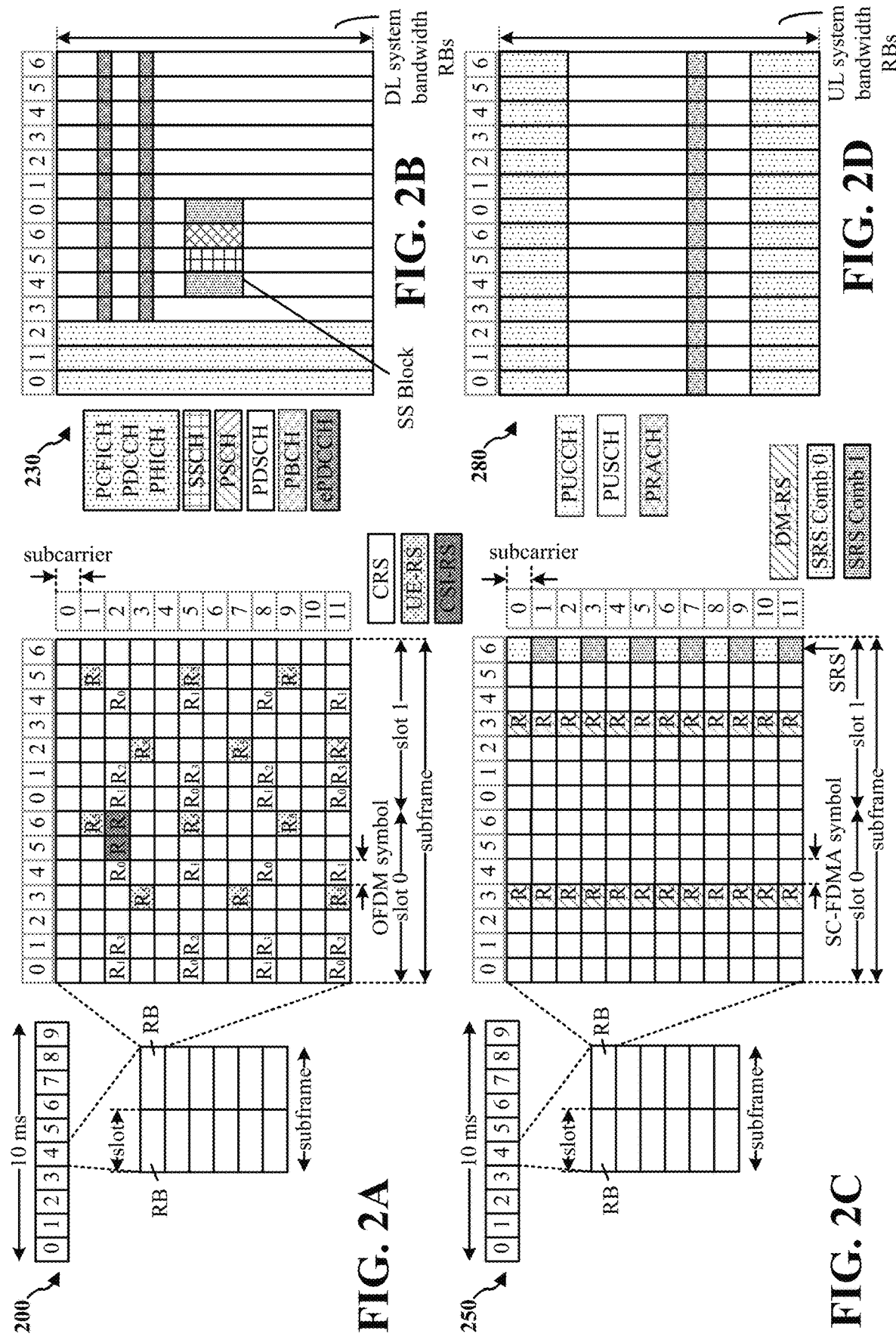
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
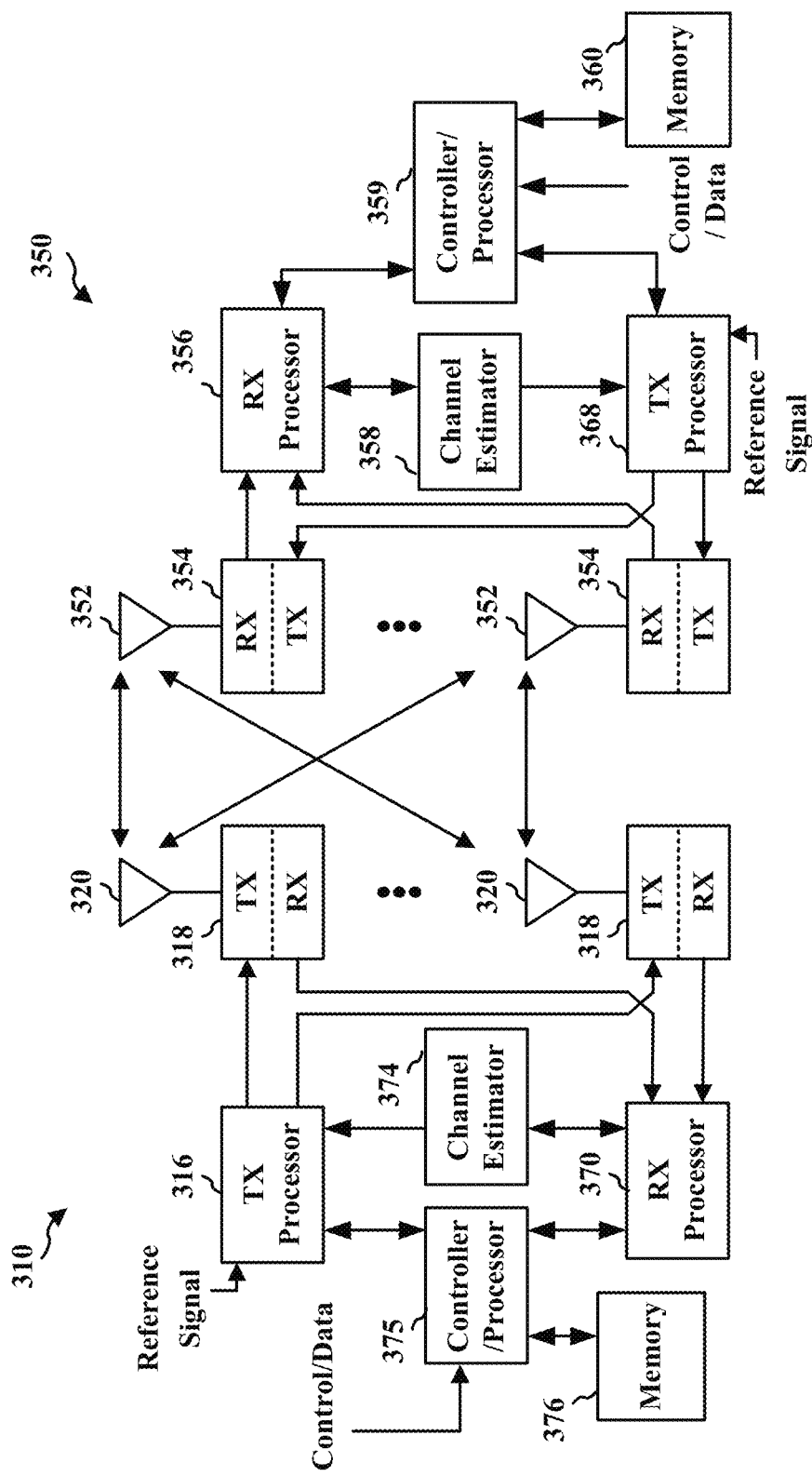
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
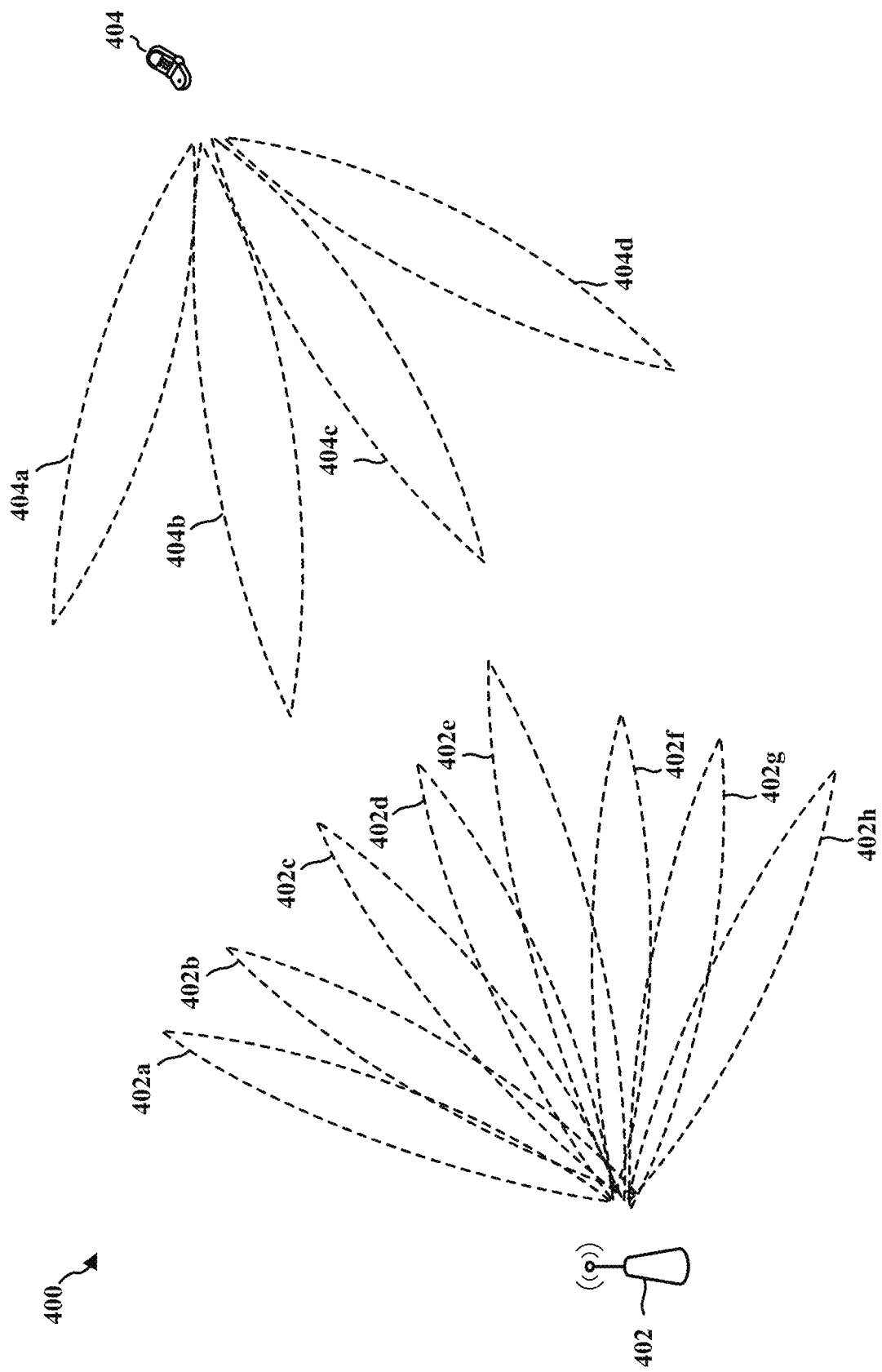
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

One way to meet the increasing demand for mobile broadband may be to utilize the mmW spectrum in addition to LTE. Communications using the mmW spectrum may experience extremely high path loss and a short range. Beamforming may be used to compensate for the high path loss and short range. For example, a VR wireless device may be equipped with multiple subarrays of mmW antennas.

However, due to the potentially large number of antennas at an mmW node (e.g., mmW base station, mmW AP, etc.) and subarrays of mmW antennas at a wireless device (e.g., a UE, VR wireless device, STA, cell phone, smart phone, etc.), the number of possible beamforming directions that may need to be scanned during a beamforming procedure can be quite large.

For example, a wireless device may connect to a serving mmW node, and one or multiple subarrays at the wireless device may be beamformed with the serving mmW node prior to initiating mmW communications (e.g., (e.g., using the 802.11ad LAN protocol for short-range indoor and/or outdoor mmW communications). When the wireless device rotates (e.g., an orientation of the subarrays at the wireless device changes), the wireless device may adjust the beamforming direction, the beamforming coefficients (e.g., used to determine a beamforming direction), wireless device subarray selections, or even hand off to a different mmW node. In addition, the serving mmW node may adjust a beamforming direction, beamforming coefficient, and/or the mmW antennas used for mmW communication when the wireless device changes orientation and/or rotates.

To this end, both the wireless device and the mmW node may scan through a plurality of TX/RX beams to measure the channel quality of a variety of TX/RX beam pairs (e.g., beamforming directions), and adjust one or more of a beamforming direction, beamforming coefficient, wireless device subarray selections, and/or the mmW antennas based on the scanning process. A scanning process for a large number of potential beamforming directions may take an undesirable amount of time and create significant beam overhead.

Thus, there is a need for a technique that reduces the time needed to determine a subarray and/or beamforming direction used for mmW communication.

The present disclosure provides a solution by enabling a wireless device to maintain beamforming calibration information that includes a correlation between at least one of a plurality of wireless device positions and/or wireless device orientations, and at least one mmW node, at least one mmW subarray at the wireless device, and a corresponding beamforming direction associated with a particular orientation of the wireless device. Using information obtained with sensors located at the wireless device, the wireless device may be able to determine the orientation of the wireless device. The wireless device may then use the beamforming calibration information to select at least one of a beamforming direction, an mmW subarray, and/or an mmW node based on the determined orientation without performing a scanning process for each of the possible beamforming directions.

Consequently, a wireless device of the present disclosure may be able to reduce the time needed to determine a subarray and/or beamforming direction used for mmW communication.

FIGS. 5A-5D illustrate a data flow 500 between a wireless device 502, a first node 504, and a second node 506 that may reduce the time needed to select a node, a subarray, and/or beamforming direction used for mmW communications in accordance with certain aspects of the disclosure. The wireless device 502 may correspond to, e.g., UE 104, 350, STA 152, wireless device 602, 702, 802, 902, the apparatus 1102/1102', 1402/1402'. The first node 504 may correspond to, e.g., base station 102, 180, 310, node 604, 606, 704, 804, 904, 905 1150, 1155, 1450, 1455. The second node 506 may correspond to, e.g., base station 102, 180, 310, node 604, 606, 704, 804, 904, 905 1150, 1155, 1450, 1455. In addition, the wireless device 502, the first node 504, and the second node 506 may be configured to communicate using any type of mmW communication discussed above with respect to FIG. 1. Although two nodes are illustrated in FIGS. 5A-5D, more or fewer than two nodes may be used to determine the beamforming calibration information described with respect to FIGS. 5A-5D without departing form the scope of the present disclosure.

Figure 5A:
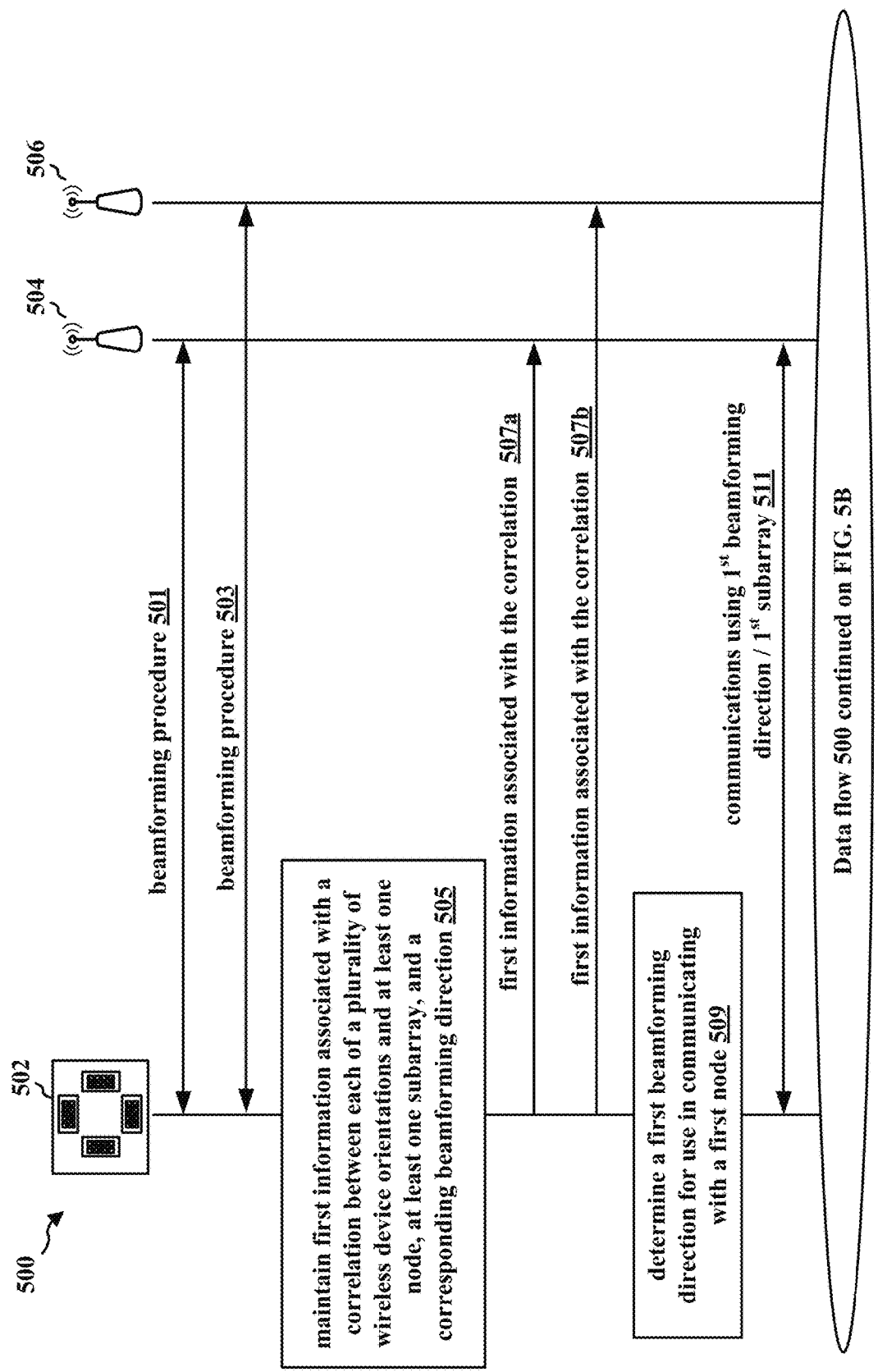

Referring to FIG. 5A, the wireless device 502 may perform a beamforming procedure 501, 503 by moving through an area that includes the first node 504 and the second node 506 (e.g., see FIG. 6). For example, the area may include a VR room with the first node 504 and the second node 506, a home with the first node 504 and the second node 506, an office space with the first node 504 and the second node 506, a shopping mall with the first node 504 and the second node 506, an indoor space with the first node 504 and the second node 506, an outdoor space with the first node 504 and the second node 506, and/or a mixed indoor/outdoor space with the first node 504 and the second node 506, etc.

The wireless device 502 may perform the beamforming procedure 501, 503 with one or more of the first node 504 and/or the second node 506 by scanning through a plurality of different beam directions (e.g., see 402a, 402b, 402c, 402d, 402e, 402f, 402g, 402h, 404a, 404b, 404c, 404d in FIG. 4) that are each associated with a particular location (e.g., an elevation of subarrays at the wireless device) and/or orientation (e.g., an orientation of the subarrays at the wireless device with respect to a node—see FIG. 6) of the wireless device 502. In one aspect, the wireless device 502 may perform the beamforming procedure 501, 503 before entering an operational mode to begin mmW communication with the first node 504 and/or the second node 506.

Based on the beamforming procedure 501, 503 performed at each orientation of the subarrays, the wireless device 502 may determine, e.g., at least one of a preferred beamforming direction, a preferred subarray (e.g., see 610a, 610b, 610c, 610d in FIG. 6), and/or a preferred node for that orientation. Each orientation of the wireless device 502 may be determined based on sensor measurements (e.g., gyroscope measurements) taken at the wireless device 502. For example, as the wireless device 502 rotates, the wireless device 502 may obtain orientation information (e.g., associated with the orientation of the subarrays of the wireless device), and information associated with a preferred node, a preferred subarray, and/or a preferred beamforming direction associated with that particular orientation. In addition, depending on the orientation of the wireless device 502, one or more of the subarrays (e.g., see subarrays 610a, 610b, 610c, 610d in FIG. 6) may be covered, e.g., by a user's hand. The gyroscope measurement(s) may indicate which of the subarrays are covered, e.g., by a user's hand. If one of the subarrays is covered, the wireless device 502 may understand that certain beams associated with the covered subarray may be unavailable for mmW communications with one or more nodes.

In one aspect, the preferred node, the preferred subarray, and/or the preferred beamforming direction may be determined, e.g., based on a particular signal parameter (e.g., the highest signal strength, the signal with the highest quality-of-service (QoS), a signal that experiences the least amount of interference, etc.) associated with a particular orientation. In one configuration, the wireless device 502 may determine multiple combinations of preferred nodes, subarrays, and/or beamforming directions for each orientation, and rank each combination based on preference.

In a first configuration, the beamforming procedure 501, 503 may include determining a preferred beamforming direction, a preferred subarray, and a preferred node for a particular orientation. In a second configuration, the beamforming procedure 501, 503 may include determining a preferred beamforming direction, a preferred subarray, and a preferred node for a particular location and a particular orientation associated with that location.

In another aspect, the wireless device 502 may maintain 505 first information (e.g., beamforming calibration information) associated with a correlation between each of a plurality of wireless device orientations, and at least one preferred node, at least one preferred subarray, and at least one preferred beamforming direction obtained during the beamforming procedure 501, 503. In one aspect, the first information (e.g., look-up-table of beamforming calibration information) may be maintained locally at the wireless device 502. In another configuration, the first information may be maintained externally to the wireless device 502, and accessed by the wireless device 502 using one of radio access technologies discussed above.

In a further aspect, the wireless device 502 may transmit the first information 507a, 507b to the first node 504 and the second node 506.

Figure 9:
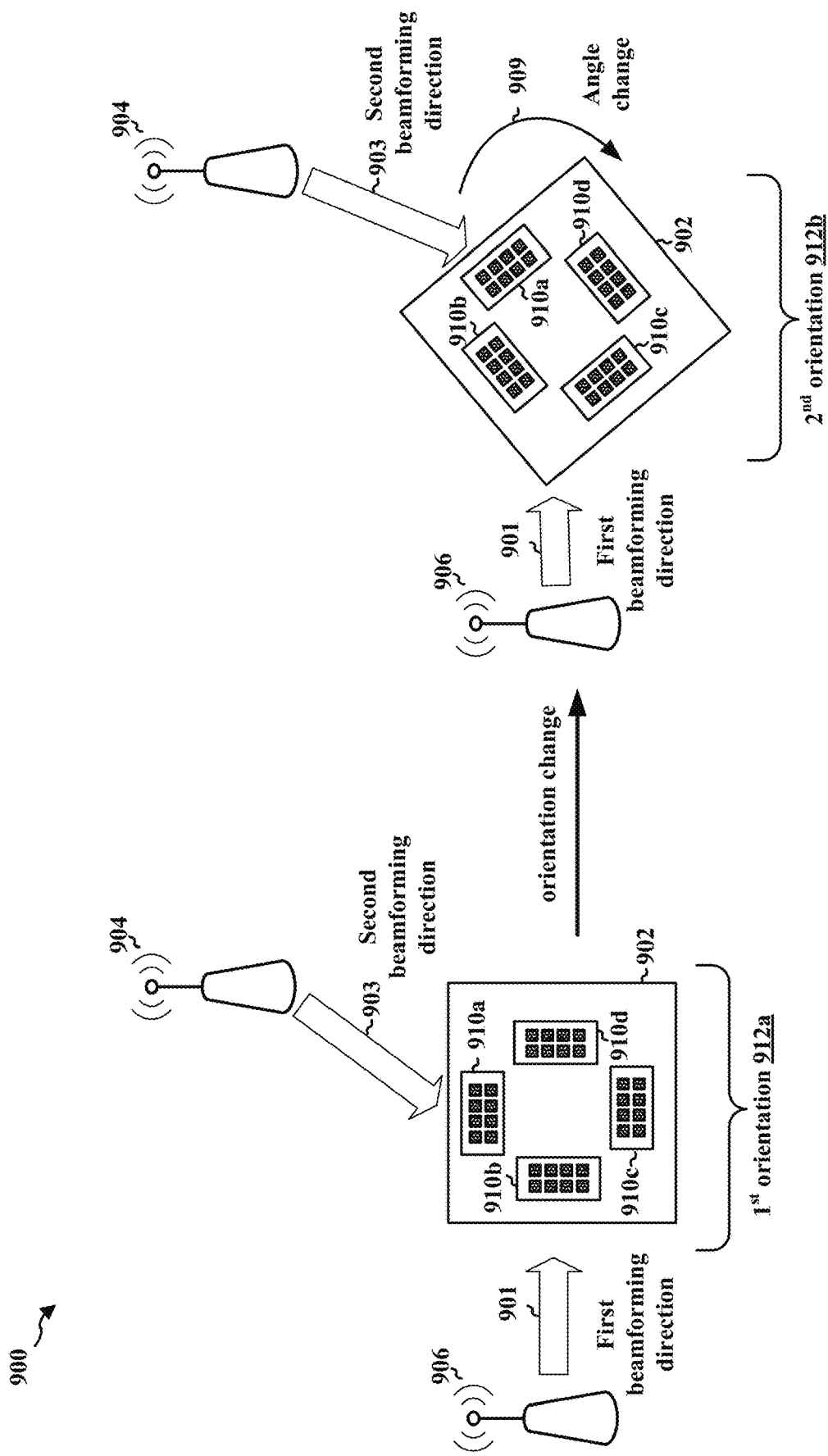
FIG. 9 illustrates a predictive beamforming procedure and/or a predictive subarray selection procedure in accordance with certain aspects of the disclosure.

In one aspect, once in operational mode, the wireless device 502 may determine 509 a first beamforming direction (e.g., see beamforming direction 901 in FIG. 9) for use in communicating with a first node 504 (e.g., see second node 906 in FIG. 9). In one aspect, the first beamforming direction may be determined based at least in part on an orientation of a first subarray (e.g., see subarray 910b in FIG. 9) at the wireless device 502 and the first information. For example, the wireless device 502 may access the first information and determine a beamforming direction that is associated with a particular orientation. For example, the wireless device 502 may access the look-up-table that includes the first information, and using the current orientation information, the wireless device 502 may determine which of the nodes, subarrays, and/or beamforming directions to use for mmW communications without performing a scanning procedure. In the particular example illustrated in FIG. 5A, the wireless device 502 determines to communicate 511 with the first node 504, using a first subarray, and a first beamforming direction.

Referring to FIG. 5B, the wireless device 502 may determine 513 a change in the orientation of the first subarray based at least in part on second information obtained from one or more sensors at the wireless device. In one aspect, the change in the orientation of the first subarray may include an angle change (e.g., see angle change 909 in FIG. 9) in an angle between the first subarray (e.g., see subarray 910b after the orientation change in FIG. 9) and the first node (e.g., see second node 906 in FIG. 9). In another aspect, the change in orientation may be related to an elevation of the wireless device 502. In a further aspect, the change in orientation may be related to a change in an elevation (e.g., elevation change) of the wireless device 502 and/or a change in a position (e.g., position change) of the first subarray with respect to an azimuth.

In certain other implementations, the wireless device 502 may determine 515 a second subarray (e.g., see subarray from a plurality of subarrays based at least in part on the first beamforming direction, the change in the orientation of the first subarray, and second information associated with the first subarray and the second subarray. For example, the wireless device 502 may access the look-up-table that includes the first information, and using the current orientation information, the wireless device 502 may determine which of the nodes, subarrays, and/or beamforming directions to use for mmW communications without performing a scanning procedure and/or determining a signal strength associated with a particular beamforming direction.

In certain other implementations, the wireless device 502 may determine 517 a second beamforming direction based at least in part on the first beamforming direction, a change in the orientation of the first subarray, and the first information. In one aspect the second beamforming direction may be determined based at least in part on the second information. For example, when the wireless device 502 rotates, the wireless device 502 may receive reports and/or measurements from internal sensors (e.g., a gyroscope) that indicate the change of orientation. The wireless device 502 may predict and switch to the new beamforming direction based on knowledge of the orientation of the subarrays, and which beamforming direction(s) are associated with the new orientation of the wireless device 502. In one implementation, the reports and/or measurements may be received from, e.g., a gyroscope located at the wireless device 502.

Referring to FIG. 5B, in one implementation, the wireless device 502 may determine 519 that a first signal strength between the first subarray (e.g., see subarray 810a in FIG. 8) and the first node (e.g., see node 804 in FIG. 8) is less than a threshold value when using the second beamforming direction (e.g., see beamforming direction 801 in FIG. 8). For example, the wireless device 502 may determine 519 that the first signal strength between the first subarray and the first node is less than a threshold value when using the second beamforming direction, e.g., based on a particular signal parameter (e.g., signal strength, QoS level, interference level, etc.) associated with the second beamforming direction. Additionally and/or alternatively, the wireless device 502 may use the first information and/or the second information to predict that the first signal strength between the second subarray and the first node is less than the threshold value when using the second beamforming direction without measuring the signal strength.

Figure 5C:
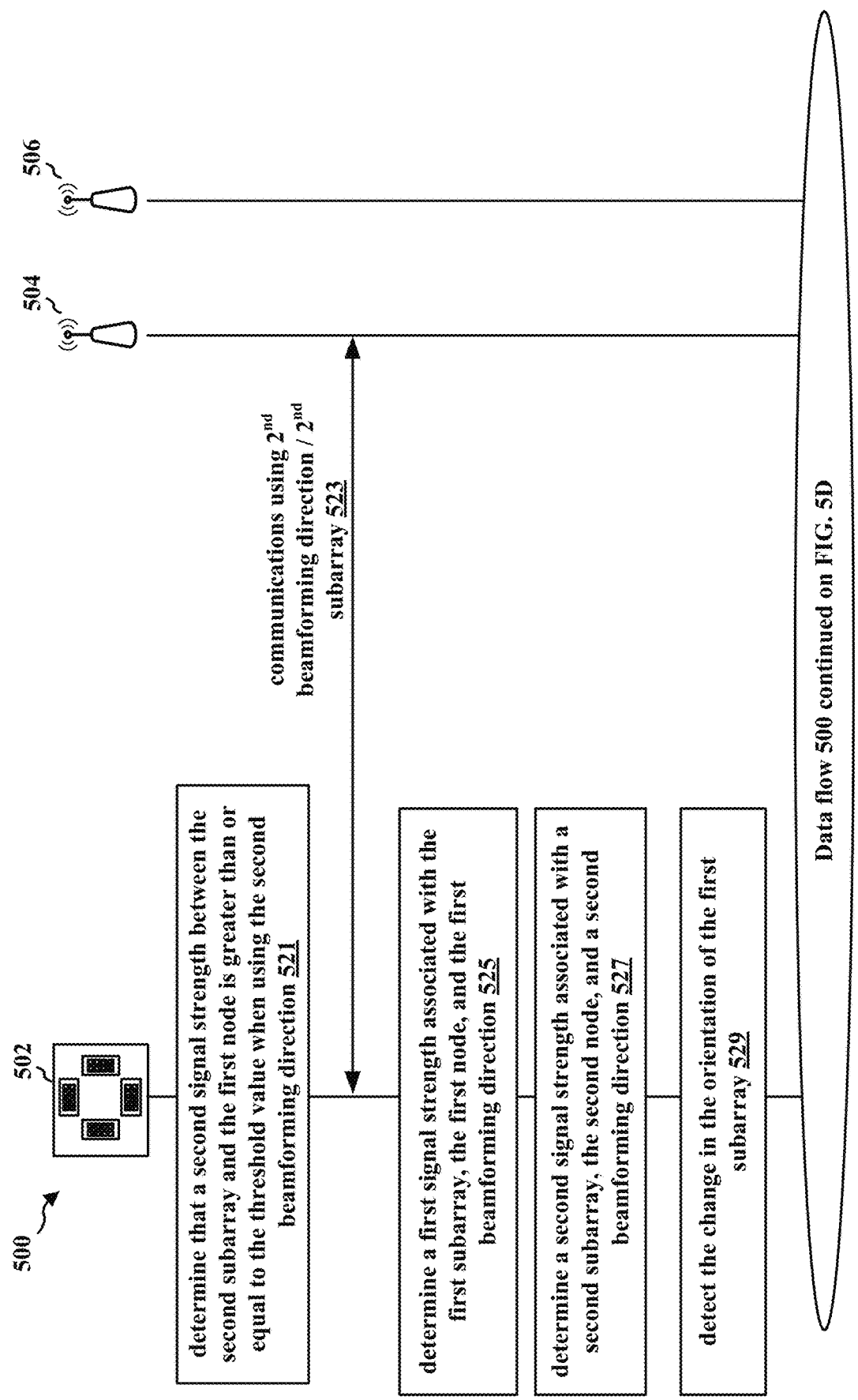

Referring to FIG. 5C, the wireless device 502 may determine 521 that a second signal strength between the second subarray (e.g., see subarray 810b in FIG. 8) and the first node (e.g., see node 804 in FIG. 8) is greater than or equal to the threshold value when using the second beamforming direction (e.g., see beamforming direction 801 in FIG. 8). For example, the wireless device 502 may determine 521 that the second signal strength between the second subarray and the first node is greater than or equal to the threshold value when using the second beamforming direction, e.g., based on a particular signal parameter (e.g., signal strength, QoS level, interference level, etc.) associated with the second beamforming direction. Additionally and/or alternatively, the wireless device 502 may use the first information and/or the second information to predict that the second signal strength between the second subarray and the first node is greater than or equal to the threshold value when using the second beamforming direction without measuring the signal strength.

In the example illustrated in FIG. 5C, the wireless device 502 may communicate 523 with the first node 504, using the second subarray, and the second beamforming direction based on the change in orientation.

In one implementation, the wireless device 502 may determine the second beamforming direction by determining 525 a first signal strength associated with the first subarray, the first node, and the first beamforming direction. For example, the wireless device 502 may determine 525 the first signal strength associated with the first subarray (e.g., subarray 910b after the orientation change in FIG. 9), the first node (e.g., second node 906 in FIG. 9), and the first beamforming direction (e.g., beamforming direction 901 after the orientation change in FIG. 9), e.g., based on a particular signal parameter (e.g., signal strength, QoS level, interference level, etc.) associated with the first subarray, the first node, and the first beamforming direction.

In certain other implementations, the wireless device 502 may determine the second beamforming direction by determining 527 a second signal strength associated with a second subarray, the second node, and a second beamforming direction. For example, the wireless device 502 may determine 527 the second signal strength associated with the second subarray (e.g., subarray 910a after the orientation change in FIG. 9), the second node (e.g., first node 904 in FIG. 9), and the second beamforming direction (e.g., beamforming direction 903 after the orientation change in FIG. 9), e.g., based on a particular signal parameter (e.g., signal strength, QoS level, interference level, etc.) associated with the second subarray, the second node, and the second beamforming direction.

In certain other implementations, the wireless device 502 may determine the second beamforming direction by detecting 529 the change in the orientation of the first subarray. For example, the change in the orientation of the first subarray may include an angle change (e.g., see angle change 909 in FIG. 9) in an angle between the first subarray (e.g., see subarray 910b in FIG. 9) and the first node (e.g., see second node 906 in FIG. 9). In one aspect, the change in orientation may be detected based on measurements taken, e.g., by a gyroscope at the wireless device 502.

Referring to FIG. 5D, the wireless device 502 may determine the second beamforming direction by determining 531 that the first signal strength associated with the first subarray, the first node, and the first beamforming direction is less than a threshold value based on the change in the orientation of the first subarray and the first information. For example, the wireless device 502 may determine 531 the first signal strength associated with the first subarray (e.g., subarray 910b after the orientation change in FIG. 9), the first node (e.g., second node 906 in FIG. 9), and the first beamforming direction (e.g., beamforming direction 901 after the orientation change in FIG. 9), e.g., based on a particular signal parameter (e.g., signal strength, QoS level, interference level, etc.) associated with the first subarray, the first node, and the first beamforming direction. The wireless device 502 may compare the determined first signal strength to the threshold value to determine that the first signal strength is less than the threshold value.

In one implementation, the wireless device 502 may determine the second beamforming direction by determining 533 that the second signal strength associated with the second subarray, the second node, and the second beamforming direction is greater than or equal to the threshold value based at least in part on the change in the orientation of the first subarray and the first information. For example, the wireless device 502 may determine 533 the second signal strength associated with the second subarray (e.g., subarray 910a after the orientation change in FIG. 9), the second node (e.g., first node 904 in FIG. 9), and the second beamforming direction (e.g., beamforming direction 903 after the orientation change in FIG. 9), e.g., based on a particular signal parameter (e.g., signal strength, QoS level, interference level, etc.) associated with the second subarray, the second node, and the second beamforming direction. The wireless device 502 may compare the determined second signal strength to the threshold value to determine that the second signal strength is greater than or equal to the threshold value.

FIG. 6 is a diagram illustrating a beamforming procedure 600 used to determine beamforming and/or subarray calibration information by a wireless device 602 moving through an area that includes a first node 604, a second node 606, and a third node 608 in accordance with certain aspects of the disclosure. The wireless device 602 may correspond to, e.g., UE 104, 350, STA 152, wireless device 502, 702, 802, 902, the apparatus 1102/1102', 1402/1402'. The first node 604 may correspond to, e.g., base station 102, 180, 310, node 504, 506, 704, 804, 904, 906, 1150, 1155, 1450, 1455. The second node 606 may correspond to, e.g., base station 102, 180, 310, node 504, 506, 704, 804, 904, 906, 1150, 1155, 1450, 1455. Although three nodes are illustrated in FIG. 6, more or fewer than three nodes may be used to determine beamforming calibration information without departing form the scope of the present disclosure.

The wireless device 602 depicted in FIG. 6 may be changing orientation in an area that includes first node 604, second node 606, and the third node 608 and performing a beamforming procedure 600 to determine first information 603 (e.g., a correlation between each of a plurality of wireless device orientations and at least one node, at least one subarray, and a corresponding beamforming direction). The wireless device 602 in FIG. 6 is depicted as having four subarrays 610a, 610b, 610c, 610d. However, the wireless device 602 may include more or fewer than four subarrays without departing from the scope of the present disclosure.

In the example illustrated in FIG. 6, the wireless device 602 may determine, at the first orientation 612, that the first node 604 is the preferred node. In addition, at the first orientation 612, the wireless device 602 may determine that subarray 610a is the preferred subarray. At the first orientation 612, the wireless device may also determine the preferred beamforming direction 601. As the wireless device 602 changes orientation in the area, the beamforming procedure discussed above may be performed at multiple orientations, and optionally, at multiple locations to determine first information 603 that is maintained by the wireless device 602.

FIG. 7 is a diagram illustrating a predictive beamforming procedure 700 using the first information discussed above with respect to FIGS. 5A-5D and 6 to determine a preferred node, a preferred subarray, and a preferred beamforming direction for mmW communications at a particular orientation in accordance with certain aspects of the disclosure. The wireless device 702 may correspond to, e.g., UE 104, 350, STA 152, wireless device 502, 602, 802, 902, the apparatus 1102/1102', 1402/1402'. The node 704 may correspond to, e.g., base station 102, 180, 310, node 504, 506, 604, 606, 608, 804, 904, 906, 1150, 1155, 1450, 1455. Although one node is illustrated in FIG. 7, more than one node may be located in an area without departing form the scope of the present disclosure.

The wireless device 702 depicted in FIG. 7 may change orientation in an area that includes node 704, and perform predictive beamforming and/or predictive subarray selection to determine a preferred node, a preferred subarray, and a preferred beamforming direction at a first orientation 712a and a second orientation 712b. In addition, the wireless device 702 is depicted in FIG. 7 as having one subarray 710. However, the wireless device 702 may include more than one subarray without departing from the scope of the present disclosure.

In the example illustrated in FIG. 7, the wireless device 702 may determine, at the first orientation 712a, that the node 704 is the preferred node. In addition, at the first orientation 712a, the wireless device 702 may determine that subarray 710 is the preferred subarray. At the first orientation 712a, the wireless device 702 may also determine the preferred beamforming direction 701.

Still referring to the example illustrated in FIG. 7, at the second orientation 712b, the wireless device 702 may determine that an orientation change (e.g., angle change 709) has occurred and that subarray 710 is still the preferred subarray. In addition, at the second orientation 712b, the wireless device 702 may determine that the node 704 is still the preferred node. At the second orientation 712b, the wireless device 702 may also determine the preferred beamforming direction 711 using predictive beamforming (e.g. using the look-up table and the angle change information discuss above with respect to FIGS. 5A-5D).

FIG. 8 is a diagram illustrating a predictive subarray selection procedure 800 using the first information discussed above with respect to FIGS. 5A-5D and 6 to determine a preferred node, a preferred subarray, and a preferred beamforming direction for mmW communications at a particular location and/or orientation in accordance with certain aspects of the disclosure. The wireless device 802 may correspond to, e.g., UE 104, 350, STA 152, wireless device 502, 602, 702, 902, the apparatus 1102/1102', 1402/1402'. The node 804 may correspond to, e.g., base station 102, 180, 310, node 504, 506, 604, 606, 608, 704, 904, 906, 1150, 1155, 1450, 1455. Although one node is illustrated in FIG. 8, more than one node may be located in an area without departing form the scope of the present disclosure.

The wireless device 802 depicted in FIG. 8 may change orientation in an area that includes node 804, and perform predictive subarray selection to determine a preferred node, a preferred subarray, and a preferred beamforming direction at a first orientation 812a and a second orientation 812b. In addition, the wireless device 802 is depicted in FIG. 8 as having two subarrays 810a, 810b. However, the wireless device 802 may include more or fewer than two subarrays without departing from the scope of the present disclosure.

In the example illustrated in FIG. 8, the wireless device 802 may determine, at the first orientation 812a, that the node 804 is the preferred node. In addition, at the first orientation 812a, the wireless device 802 may determine that subarray 810a is the preferred subarray. At the first orientation 812a, the wireless device 802 may also determine the preferred beamforming direction 801.

Still referring to the example illustrated in FIG. 8, the wireless device 802 may determine, at the second orientation 812b, that an orientation change (e.g., angle change 809) has occurred and that subarray 810b is now the preferred subarray using predictive subarray selection (e.g., based on knowledge of the orientation of the subarrays 810a, 810b, the beamforming direction 810, and/or the maintained first information). In addition, at the second orientation 812b, the wireless device 802 may determine that the node 804 is still the preferred node. At the second orientation 812b, the wireless device 802 may also determine the preferred beamforming direction is still beamforming direction 801.

FIG. 9 is a diagram illustrating a predictive beamforming and/or predictive subarray selection procedure 900 using the first information discussed above with respect to FIGS. 5A-5D and 6 to determine a preferred node, a preferred subarray, and a preferred beamforming direction for mmW communications at a particular orientation in accordance with certain aspects of the disclosure. The wireless device 902 may correspond to, e.g., UE 104, 350, STA 152, wireless device 502, 602, 702, 802, the apparatus 1102/1102', 1402/1402'. The first node 904 may correspond to, e.g., base station 102, 180, 310, node 504, 506, 604, 606, 608, 704, 804, 1150, 1155, 1450, 1455. The second node 906 may correspond to, e.g., base station 102, 180, 310, node 504, 506, 604, 606, 608, 704, 804, 1150, 1155, 1450, 1455. Although two nodes are illustrated in FIG. 9, more than two nodes may be located in an area without departing form the scope of the present disclosure.

The wireless device 902 depicted in FIG. 9 may change orientation in an area that includes nodes 904, 906, and perform predictive subarray selection to determine a preferred node, a preferred subarray, and a preferred beamforming direction at a first orientation 912a and a second orientation 912b. Although the wireless device 902 is depicted in FIG. 9 as having four subarrays 910a, 910b, 910c, 910d, the wireless device 902 may include more or fewer than four subarrays without departing from the scope of the present disclosure. In addition, the wireless device 902 illustrated in FIG. 9 may maintain a connection with the first node 904 and the second node 906. As the wireless device 902 rotates, the wireless device 902 may use the predictive beamforming and subarray selection schemes described above with respect to FIGS. 5A-5D to predict the channel gains of the currently known channel paths. Using the information on channel gains, the wireless device 902 may determine when to handoff from the second node 906 to the first node 904 (e.g., after the orientation change).

In the example illustrated in FIG. 9, the wireless device 902 may determine, at the first orientation 912a, that the second node 906 is the preferred node. In addition, at the first orientation 912a, the wireless device 902 may determine that the second subarray 910b is the preferred subarray. At the first orientation 912a, the wireless device 902 may also determine the preferred beamforming direction 901. In other words, the wireless device 902 may communicate with the second node 906 using the beamforming direction 901 selected from the first information. In certain aspects, the first beamforming direction 901 may be correlated with the first orientation 912a of the second subarray 910b and the second node 906 in the first information maintained by the wireless device 902 (e.g., see operation 505 described above in connection with FIG. 5A).

Still referring to the example illustrated in FIG. 9, at the second orientation 912b, the wireless device 902 may determine that an orientation change (e.g., angle change 909 detected by a gyroscope) has occurred, which may trigger a beamforming, subarray, and node selection procedure. After the orientation change, subarray 910a is now the preferred subarray in the example illustrated in FIG. 9. In addition, the wireless device 902 may determine, at the second orientation 912b, that the first node 904 is now the preferred node.

At the second orientation 912b, the wireless device 902 may also determine that the preferred beamforming direction is the second beamforming direction 903. For example, the wireless device 902 may perform a handoff procedure from the second node 906 to the first node 904 when the orientation (e.g., position) of the second subarray 910b changes from the first orientation 912a to the second orientation 912b.

The wireless device 902 may select the second beamforming direction 903 for use in communicating with the first node 904 from the first information (e.g., the information maintained at operation 505 in FIG. 5A) based at least in part on the second orientation 912b of the second subarray 910b. In one implementation, the wireless device 902 may determine the second beamforming direction by determining a first signal strength associated with the second subarray 910b, the second node 906, and the first beamforming direction 901 after the orientation change, e.g., based on a particular signal parameter (e.g., signal strength, QoS level, interference level, etc.) associated with the second subarray 910b, the second node 906, and the first beamforming direction 901.

In certain other implementations, the wireless device 902 may determine the second beamforming direction by determining a second signal strength associated with the first subarray 910a, the first node 904, and a second beamforming direction 903 after the orientation change, e.g., based on a particular signal parameter (e.g., signal strength, QoS level, interference level, etc.) associated with the first subarray 910a, the first node 904, and the second beamforming direction 903.

Based at least in part based at least in part on the orientation of the second subarray 910b, the first signal strength, and the second signal strength described above, the wireless device 902 may determine to communicate with the first node 904 using the first subarray 910a and the second beamforming direction 903. For example, the wireless device 902 may determine to communicate with the first node 904 using the first subarray 910a and the second beamforming direction 903 by determining that the first signal strength associated with the second subarray 910b, the second node 906, and the first beamforming direction 901 is less than a threshold value based on the change in the orientation of the second subarray 910b and the maintained information (e.g., see operation 505 in FIG. 5A), and that a second signal strength associated with the first subarray 910a, the first node 904, and the second beamforming direction 903 is greater than or equal to a threshold value.

Referring to the example illustrated in FIG. 9, the wireless device 902 may determine the first signal strength associated with the second subarray 910b, the second node 906, and the first beamforming direction 901, e.g., based on a particular signal parameter (e.g., signal strength, QoS level, interference level, etc.) associated with the second subarray 910b, the second node 906, and the first beamforming direction 901. The wireless device 902 may compare the determined first signal strength to the threshold value to determine that the first signal strength is less than the threshold value.

Still referring to the example illustrated in FIG. 9, the wireless device 902 may determine to communicate with the first node 904 using the second beamforming direction 903 by determining that the second signal strength associated with the first subarray 910a, the first node 904, and the second beamforming direction 903 is greater than or equal to the threshold value based at least in part on the change in the orientation of the second subarray 910b and the first information (e.g., the information maintained at operation 505 in FIG. 5A). For example, the wireless device 902 may determine the second signal strength associated with the first 910a, the first node 904, and the second beamforming direction 903, e.g., based on a particular signal parameter (e.g., signal strength, QoS level, interference level, etc.). The wireless device 902 may compare the determined second signal strength to the threshold value to determine that the second signal strength is greater than or equal to the threshold value, and hence, may determine to communicate with the first node 904 using the first subarray 910a and the second beamforming direction 903 after the orientation change.

The determination of one or more of the preferred subarray 910a, the preferred node 904, and/or the preferred beamforming direction 903 may be based on knowledge of the orientation of the subarrays 910a, 910b, 910c, 910d, the angle change 909, the beamforming direction 901, and/or the maintained first information (e.g., discussed above with respect to FIGS. 5A-5D and 6).

Figure 10A:
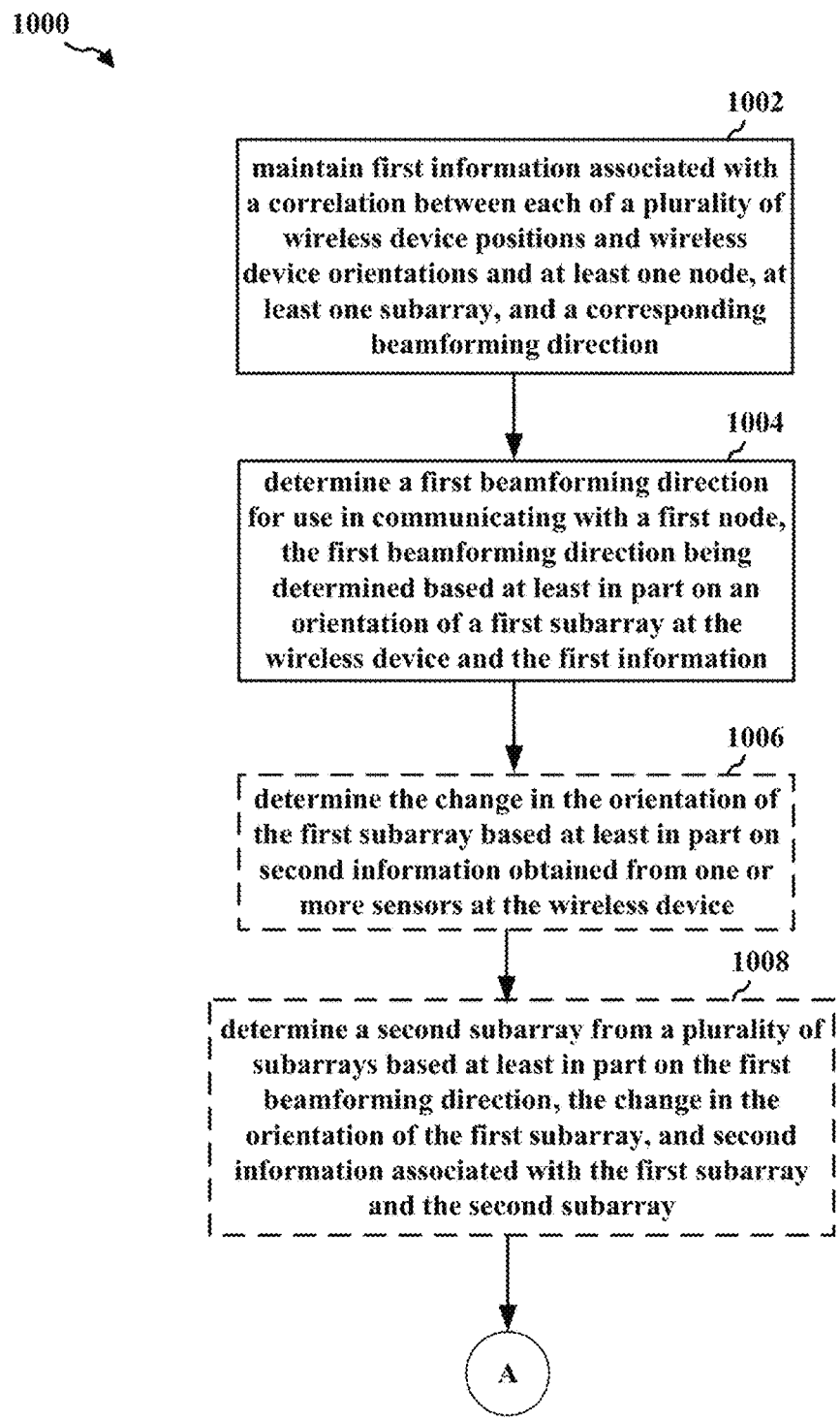
FIGS. 10A-10C are a flowchart of a method of wireless communication.
Figure 10B:
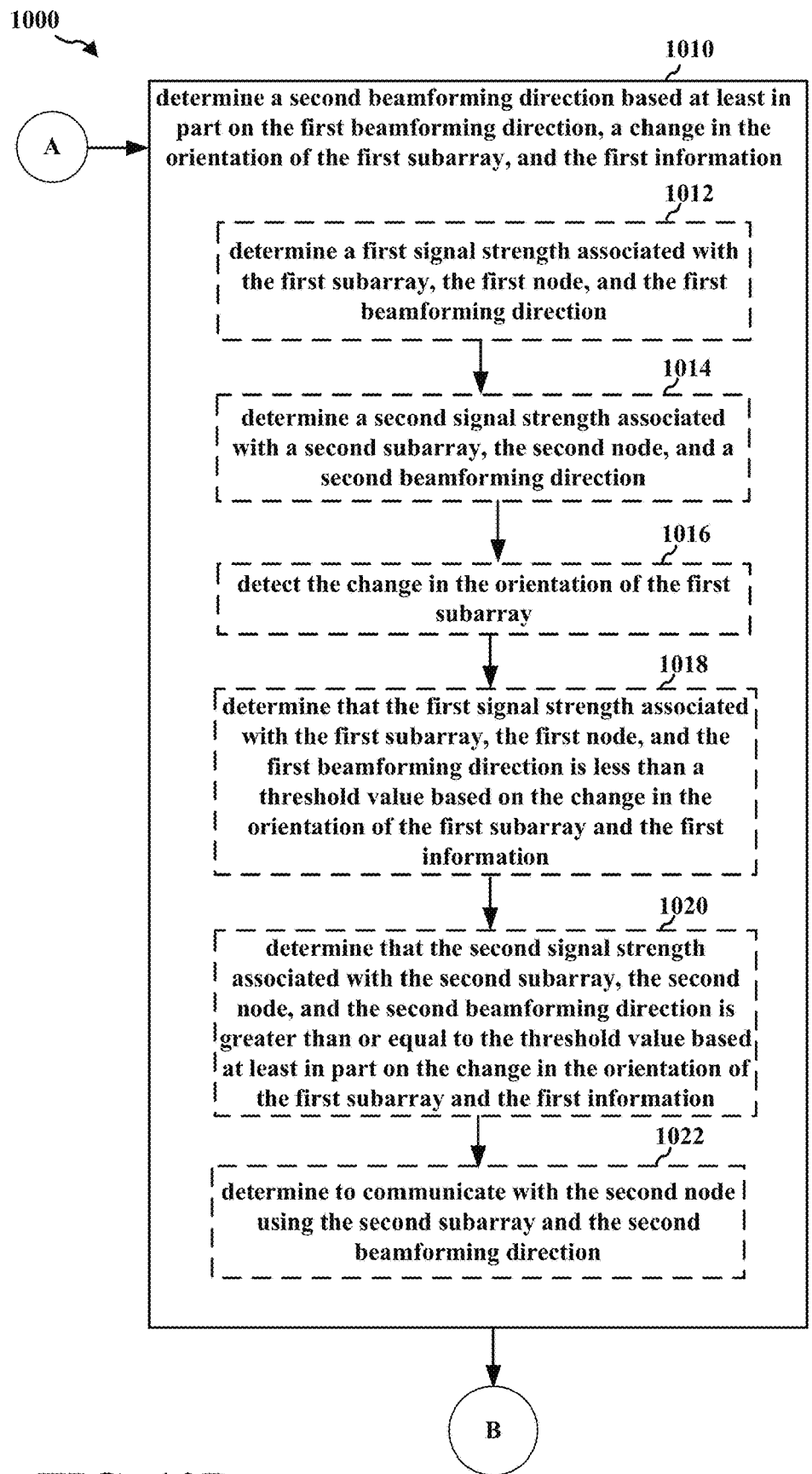
Figure 10C:
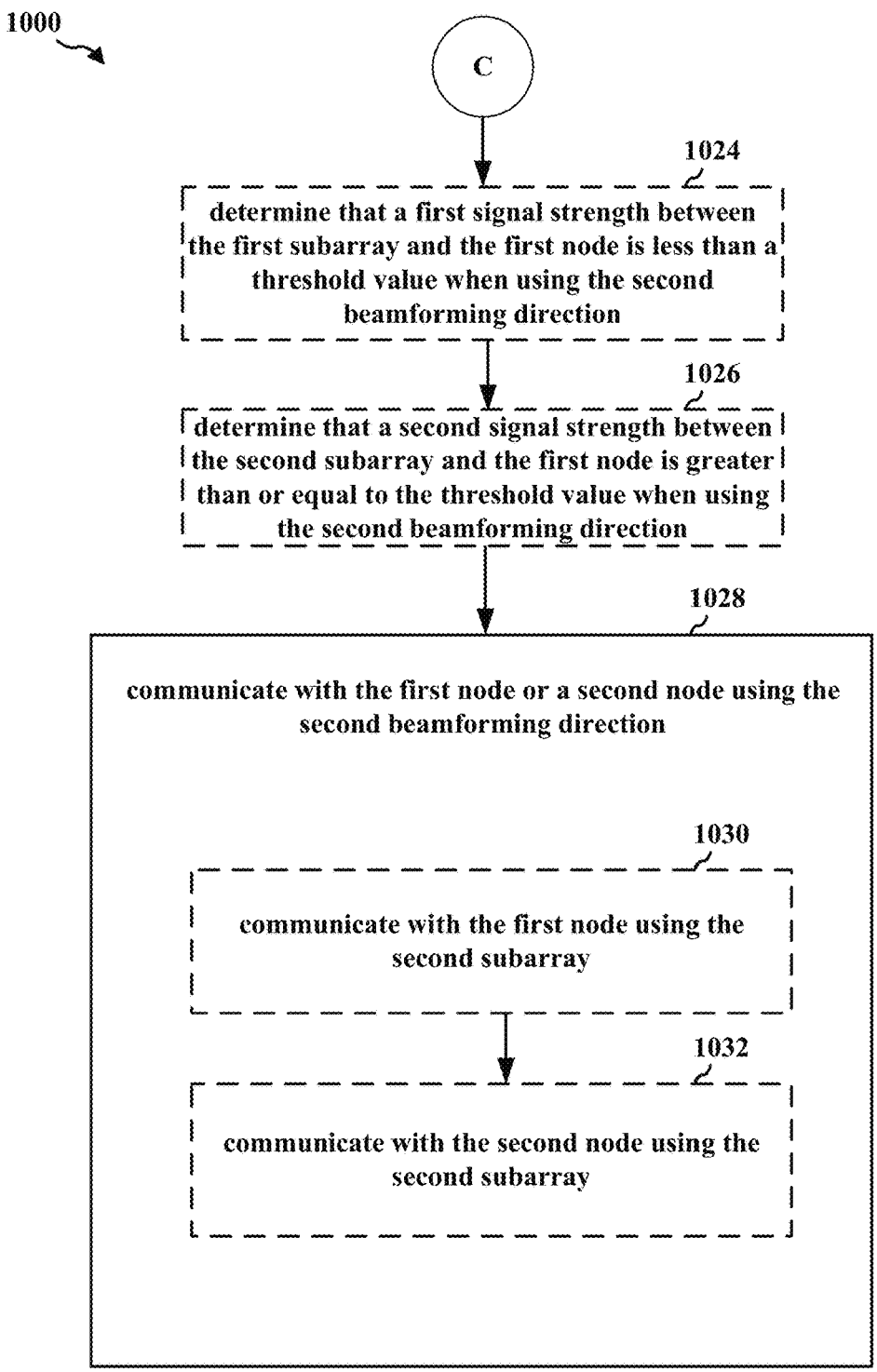

FIGS. 10A-10C are a flowchart 1000 of a method of wireless communication. The method may be performed by a wireless device (e.g., the UE 104, 350, STA 152, wireless device 502, 602, 702, 802, 902 the apparatus 1102/1102', 1402/1402') in communication with a plurality of nodes (e.g., the base station 102, 180, 310, node 504, 506, 604, 606, 608, 704, 804, 904, 906, 1150, 1155, 1450, 1455). In FIGS. 10A-10C, operations indicated with dashed lines may represent optional operations.

Referring to FIG. 10A, at 1002, the wireless device may maintain first information associated with a correlation between each of a plurality of wireless device orientations and at least one node, at least one subarray, and a corresponding beamforming direction. For example, referring to FIG. 5A, the wireless device 502 may transmit the first information 507a, 507b to the first node 504 and the second node 506. For example, referring to FIG. 5A, the wireless device 502 may maintain 505 first information (e.g., beamforming calibration information) associated with a correlation between each of a plurality of wireless device orientations, and at least one preferred node, at least one preferred subarray, and at least one preferred beamforming direction obtained during the beamforming procedure 501, 503. In one aspect, the first information (e.g., look-up-table of beamforming calibration information) may be maintained locally at the wireless device 502. In another configuration, the first information may be maintained externally to the wireless device 502, and accessed by the wireless device 502 using one of radio access technologies discussed above. Referring to FIG. 6, the wireless device 602 may determine, at the first orientation 612, that the first node 604 is the preferred node. In addition, at the first orientation 612, the wireless device 602 may determine that subarray 610a is the preferred subarray. At the first orientation 612, the wireless device may also determine the preferred beamforming direction 601. As the wireless device 602 changes orientation in the area, the beamforming procedure discussed above may be performed at multiple orientations, and optionally, at multiple locations to determine first information 603 that is maintained by the wireless device 602.

At 1004, the wireless device may determine a first beamforming direction for use in communicating with a first node. In one aspect, the first beamforming direction may be determined based at least in part on an orientation of a first subarray at the wireless device and the first information. For example, referring to FIG. 5A, once in operational mode, the wireless device 502 may determine 509 a first beamforming direction (e.g., see beamforming direction 901 in FIG. 9) for use in communicating with a first node 504 (e.g., see second node 906 in FIG. 9). In one aspect, the first beamforming direction may be determined based at least in part on an orientation of a first subarray (e.g., see subarray 910*b* in FIG. 9) at the wireless device 502 and the first information. For example, the wireless device 502 may access the first information and determine a beamforming direction that is associated with a particular orientation. For example, the wireless device 502 may access the look-up-table that includes the first information, and using the current orientation information, the wireless device 502 may determine which of the nodes, subarrays, and/or beamforming directions to use for mmW communications without performing a scanning procedure. In the particular example illustrated in FIG. 5A, the wireless device 502 determines to communicate 511 with the first node 504, using a first subarray, and a first beamforming direction.

At 1006, the wireless device may determine the change in the orientation of the first subarray based at least in part on second information obtained from one or more sensors at the wireless device. In one aspect, the one or more sensors may include at least one gyroscope. In another aspect, the second information may be associated with geometric positions of the first subarray and the second subarray. In a further aspect, the change in the orientation of the first subarray may include an angle change in an angle between the first subarray and the first node. In one aspect, the change in the orientation of the first subarray further may include at least one of an elevation change in an elevation of the first subarray or a position change in a position of the first subarray with respect to an azimuth. For example, referring to FIG. 5B, the wireless device 502 may determine 513 a change in the orientation of the first subarray based at least in part on second information obtained from one or more sensors at the wireless device. In one aspect, the change in the orientation of the first subarray may include an angle change (e.g., see angle change 909 in FIG. 9) in an angle between the first subarray (e.g., see subarray 910*b* after the orientation change in FIG. 9) and the first node (e.g., see second node 906 in FIG. 9). In another aspect, the change in orientation may be related to an elevation of the wireless device 502. In a further aspect, the change in orientation may be related to a change in an elevation (e.g., elevation change) of the wireless device 502 and/or a change in a position (e.g., position change) of the first subarray with respect to an azimuth.

At 1008, the wireless device may determine a second subarray from a plurality of subarrays based at least in part on the first beamforming direction, the change in the orientation of the first subarray, and second information associated with the first subarray and the second subarray. For example, referring to FIG. 5B, the wireless device 502 may determine 515 a second subarray (e.g., see subarray from a plurality of subarrays based at least in part on the first beamforming direction, the change in the orientation of the first subarray, and second information associated with the first subarray and the second subarray. For example, the wireless device 502 may access the look-up-table that includes the first information, and using the current orientation information, the wireless device 502 may determine which of the nodes, subarrays, and/or beamforming directions to use for mmW communications without performing a scanning procedure and/or determining a signal strength associated with a particular beamforming direction.

Referring to FIG. 10B, at 1010, the wireless device may determine a second beamforming direction based at least in part on the first beamforming direction, a change in the orientation of the first subarray, and the first information. In one aspect, the second beamforming direction may also be determined based at least in part on the second information. In another aspect, the second beamforming direction may be determined based at least in part on the first information and the angle change in the first angle between the first subarray and the first node. Referring to FIG. 5B, the wireless device 502 may determine 517 a second beamforming direction based at least in part on the first beamforming direction, a change in the orientation of the first subarray, and the first information. In one aspect the second beamforming direction may be determined based at least in part on the second information. For example, when the wireless device 502 rotates, the wireless device 502 may receive reports and/or measurements from internal sensors (e.g., a gyroscope) that indicate the change of orientation. The wireless device 502 may predict and switch to the new beamforming direction based on knowledge of the orientation of the subarrays, and which beamforming direction(s) are associated with the new orientation of the wireless device 502. In one implementation, the reports and/or measurements may be received from, e.g., a gyroscope located at the wireless device 502.

At 1012, the wireless device may determine the second beamforming direction by determining a first signal strength associated with the first subarray, the first node, and the first beamforming direction. For example, referring to FIG. 5C, the wireless device 502 may determine the second beamforming direction by determining 525 a first signal strength associated with the first subarray, the first node, and the first beamforming direction. For example, the wireless device 502 may determine 525 the first signal strength associated with the first subarray (e.g., subarray 910*b* after the orientation change in FIG. 9), the first node (e.g., second node 906 in FIG. 9), and the first beamforming direction (e.g., beamforming direction 901 after the orientation change in FIG. 9), e.g., based on a particular signal parameter (e.g., signal strength, QoS level, interference level, etc.) associated with the first subarray, the first node, and the first beamforming direction.

At 1014, the wireless device may determine the second beamforming direction by determining a second signal strength associated with a second subarray, the second node, and a second beamforming direction. For example, referring to FIG. 5C, the wireless device 502 may determine the second beamforming direction by determining 527 a second signal strength associated with a second subarray, the second node, and a second beamforming direction. For example, the wireless device 502 may determine 527 the second signal strength associated with the second subarray (e.g., subarray 910*a* after the orientation change in FIG. 9), the second node (e.g., first node 904 in FIG. 9), and the second beamforming direction (e.g., beamforming direction 903 after the orientation change in FIG. 9), e.g., based on a particular signal parameter (e.g., signal strength, QoS level, interference level, etc.) associated with the second subarray, the second node, and the second beamforming direction.

At 1016, the wireless device may determine the second beamforming direction by detecting the change in the orientation of the first subarray. For example, referring to FIG. 5C, the wireless device 502 may determine the second beamforming direction by detecting 529 the change in the orientation of the first subarray. For example, the change in the orientation of the first subarray may include an angle change (e.g., see angle change 909 in FIG. 9) in an angle between the first subarray (e.g., see subarray 910*b* in FIG. 9) and the first node (e.g., see second node 906 in FIG. 9). In one aspect, the change in orientation may be detected based on measurements taken, e.g., by a gyroscope at the wireless device 502.

At 1018, the wireless device may determine the second beamforming direction by determining that the first signal strength associated with the first subarray, the first node, and the first beamforming direction is less than a threshold value based on the change in the orientation of the first subarray and the first information. For example, referring to FIG. 5D, the wireless device 502 may determine the second beamforming direction by determining 531 that the first signal strength associated with the first subarray, the first node, and the first beamforming direction is less than a threshold value based on the change in the orientation of the first subarray and the first information. For example, the wireless device 502 may determine 531 the first signal strength associated with the first subarray (e.g., subarray 910b after the orientation change in FIG. 9), the first node (e.g., second node 906 in FIG. 9), and the first beamforming direction (e.g., beamforming direction 901 after the orientation change in FIG. 9), e.g., based on a particular signal parameter (e.g., signal strength, QoS level, interference level, etc.) associated with the first subarray, the first node, and the first beamforming direction. The wireless device 502 may compare the determined first signal strength to the threshold value to determine that the first signal strength is less than the threshold value.

At 1020, the wireless device may determine the second beamforming direction by determining that the second signal strength associated with the second subarray, the second node, and the second beamforming direction is greater than or equal to the threshold value based at least in part on the change in the orientation of the first subarray and the first information. For example, referring to FIG. 5D, the wireless device 502 may determine the second beamforming direction by determining 533 that the second signal strength associated with the second subarray, the second node, and the second beamforming direction is greater than or equal to the threshold value based at least in part on the change in the orientation of the first subarray and the first information. For example, the wireless device 502 may determine 533 the second signal strength associated with the second subarray (e.g., subarray 910a after the orientation change in FIG. 9), the second node (e.g., first node 904 in FIG. 9), and the second beamforming direction (e.g., beamforming direction 903 after the orientation change in FIG. 9), e.g., based on a particular signal parameter (e.g., signal strength, QoS level, interference level, etc.) associated with the second subarray, the second node, and the second beamforming direction. The wireless device 502 may compare the determined second signal strength to the threshold value to determine that the second signal strength is greater than or equal to the threshold value.

At 1022, the wireless device may determine the second beamforming direction by determining to communicate with the second node using the second subarray and the second beamforming direction based at least in part on one or more of the second information associated with the first subarray and the second subarray, the change in the orientation of the first subarray, the first signal strength, and the second signal strength. For example, referring to FIG. 5D, the wireless device may determine the second beamforming direction by determining 535 to communicate 537 with the second node 506 (e.g., see the first node 904 in FIG. 9) using the second subarray (e.g., see subarray 910a after the orientation change in FIG. 9) and the second beamforming direction (e.g., beamforming direction 903 after the orientation change) based at least in part on one or more of the first information, the second information associated with the first subarray and the second subarray, the change in the orientation of the first subarray, the first signal strength, and the second signal strength.

Referring to FIG. 10C, at 1024, the wireless device may determine that a first signal strength between the first subarray and the first node is less than a threshold value when using the second beamforming direction. For example, referring to FIG. 5B, the wireless device 502 may determine 519 that a first signal strength between the first subarray (e.g., see subarray 810a in FIG. 8) and the first node (e.g., see node 804 in FIG. 8) is less than a threshold value when using the second beamforming direction (e.g., see beamforming direction 801 in FIG. 8). For example, the wireless device 502 may determine 519 that the first signal strength between the first subarray and the first node is less than a threshold value when using the second beamforming direction, e.g., based on a particular signal parameter (e.g., signal strength, QoS level, interference level, etc.) associated with the second beamforming direction. Additionally and/or alternatively, the wireless device 502 may use the first information and/or the second information to predict that the first signal strength between the second subarray and the first node is less than the threshold value when using the second beamforming direction without measuring the signal strength.

At 1026, the wireless device may determine that a second signal strength between the second subarray and the first node is greater than or equal to the threshold value when using the second beamforming direction. In one aspect, the determining that the second signal strength between the second subarray and the first node is greater than or equal to the threshold value may be based at least in part on the first information and the second information. For example, referring to FIG. 5C, the wireless device 502 may determine 521 that a second signal strength between the second subarray (e.g., see subarray 810b in FIG. 8) and the first node (e.g., see node 804 in FIG. 8) is greater than or equal to the threshold value when using the second beamforming direction (e.g., see beamforming direction 801 in FIG. 8). For example, the wireless device 502 may determine 521 that the second signal strength between the second subarray and the first node is greater than or equal to the threshold value when using the second beamforming direction, e.g., based on a particular signal parameter (e.g., signal strength, QoS level, interference level, etc.) associated with the second beamforming direction. Additionally and/or alternatively, the wireless device 502 may use the first information and/or the second information to predict that the second signal strength between the second subarray and the first node is greater than or equal to the threshold value when using the second beamforming direction without measuring the signal strength.

At 1028, the wireless device may communicate with the first node or a second node using the second beamforming direction. For example, referring to FIG. 5C, the wireless device 502 may communicate 523 with the first node 504, using the second subarray, and the second beamforming direction based on the change in orientation. Referring to FIG. 5D, the wireless device may determine the second beamforming direction by determining 535 to communicate 537 with the second node 506 (e.g., see the first node 904 in FIG. 9) using the second subarray (e.g., see subarray 910a after the orientation change in FIG. 9) and the second beamforming direction (e.g., beamforming direction 903 after the orientation change) based at least in part on one or more of the first information, the second information associated with the first subarray and the second subarray, the change in the orientation of the first subarray, the first signal strength, and the second signal strength.

At 1030, the wireless device may communicate with the first node or a second node using the second beamforming direction by communicating with the first node using the second beamforming direction and the second subarray. For example, referring to FIG. 5C, the wireless device 502 may communicate 523 with the first node 504, using the second subarray, and the second beamforming direction based on the change in orientation.

At 1032, the wireless device may communicate with the first node or a second node using the second beamforming direction by communicating with the second node using the second beamforming direction and the second subarray. For example, referring to FIG. 5D, the wireless device may determine the second beamforming direction by determining 535 to communicate 537 with the second node 506 (e.g., see the first node 904 in FIG. 9) using the second subarray (e.g., see subarray 910a after the orientation change in FIG. 9) and the second beamforming direction (e.g., beamforming direction 903 after the orientation change) based at least in part on one or more of the first information, the second information associated with the first subarray and the second subarray, the change in the orientation of the first subarray, the first signal strength, and the second signal strength.

Figure 11:
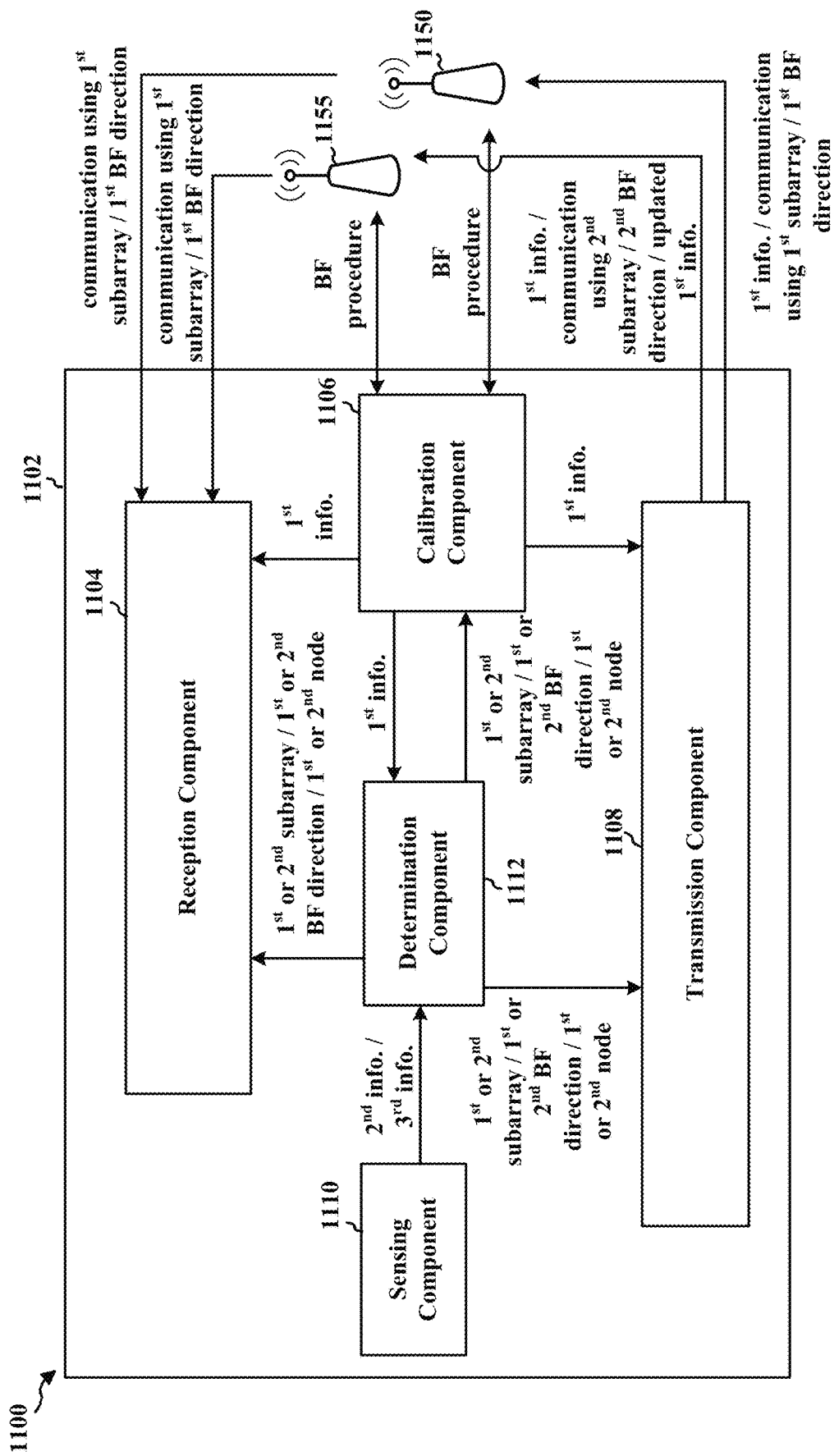
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a wireless device (e.g., the UE 104, 350, STA 152, wireless device 502, 602, 702, 802, 902 the apparatus 1102/1102', 1402/1402') in communication with a first node 1150 (e.g., the base station 102, 180, 310, node 504, 506, 604, 606, 608, 704, 804, 904, 906, 1450, 1455) and a second node 1155 (e.g., the base station 102, 180, 310, node 504, 506, 604, 606, 608, 704, 804, 904, 906, 1450, 1455). The apparatus may include a reception component 1104, a calibration component 1106, a transmission component 1108, a sensing component 1110, and a determination component 1112. The calibration component 1106 may be configured to perform a beamforming procedure with the first node 1150 and the second node 1155. In addition, the calibration component 1106 may be configured to determine a preferred node, a preferred subarray, and a preferred beamforming direction for each of a plurality of different wireless device orientations. The calibration component 1106 may also be configured to maintain first information associated with a correlation between each of a plurality of wireless device orientations and at least one node, at least one subarray, and a corresponding beamforming direction. The calibration component 1106 may be configured to send a signal associated with the first information to one or more of the reception component 1104, the transmission component 1108, and/or the determination component 1112. The determination component 1112 may be configured to determine a first beamforming direction for use in communicating with a first node. In one aspect, the first beamforming direction may be determined based at least in part on an orientation of a first subarray at the wireless device and the first information. The determination component 1112 may be configured to send a signal associated with the first beamforming direction for use in communicating with the first node 1150 to one or more of the reception component 1104, the calibration component 1106, and/or the transmission component 1108. The sensing component 1110 may be configured to sense an orientation (e.g., second information) associated with the wireless device.

The sensing component 1110 may be configured to send a signal associated with the second information to the determination component 1112. In one aspect, the sensing component 1110 may include at least one gyroscope. The determination component 1112 may be configured to determine a change in the orientation of the first subarray based at least in part on second information obtained from one or more sensors at the wireless device. In one aspect, the second information may be associated with geometric positions of the first subarray and the second subarray. In a further aspect, the change in the orientation of the first subarray may include an angle change in an angle between the first subarray and the first node. In one aspect, the change in the orientation of the first subarray further may include at least one of an elevation change in an elevation of the first subarray or a position change in a position of the first subarray with respect to an azimuth. The determination component 1112 may be configured to determine a second subarray from a plurality of subarrays based at least in part on the first beamforming direction, the change in the orientation of the first subarray, and second information associated with the first subarray and the second subarray. The determination component 1112 may be configured to determine a second beamforming direction based at least in part on the first beamforming direction, a change in the orientation of the first subarray, and the first information. In certain implementations, the second beamforming direction may be determined based at least in part on the first information and the angle change in the first angle between the first subarray and the first node. In one aspect, the second beamforming direction may also be determined based at least in part on the second information. In one aspect, the determination component 1112 may be configured to determine the second beamforming direction by determining a first signal strength associated with the first subarray, the first node, and the first beamforming direction. In another aspect, the determination component 1112 may be configured to determine the second beamforming direction by determining a second signal strength associated with a second subarray, the second node, and a second beamforming direction. In a further aspect, the determination component 1112 may be configured to determine the second beamforming direction by detecting the change in the orientation of the first subarray. In one aspect, the determination component 1112 may be configured to determine the second beamforming direction by determining that the first signal strength associated with the first subarray, the first node, and the first beamforming direction is less than a threshold value based on the change in the orientation of the first subarray and the first information. In another aspect, the determination component 1112 may be configured to determine the second beamforming direction by determining that the second signal strength associated with the second subarray, the second node, and the second beamforming direction is greater than or equal to the threshold value based at least in part on the change in the orientation of the first subarray and the first information. In one aspect, the determination component 1112 may be configured to determine the second beamforming direction by determining to communicate with the second node using the second subarray and the second beamforming direction based at least in part on one or more of the second information associated with the first subarray and the second subarray, the change in the orientation of the first subarray, the first signal strength, and the second signal strength. The determination component 1112 may be configured to send a signal associated with the determined second beamforming direction to one or more of the reception component 1104, the calibration component 1106, and/or the transmission component 1108. The determination component 1112 may be configured to determine that a first signal strength between the first subarray and the first node is less than a threshold value when using the second beamforming direction. The determination component 1112 may be configured to determine that a second signal strength between the second subarray and the first node is greater than or equal to the threshold value when using the second beamforming direction. In one aspect, the determining that the second signal strength between the second subarray and the first node is greater than or equal to the threshold value may be based at least in part on the first information and the second information. The reception component 1104 and/or the transmission component 1108 may be configured to communicate with the first node 1150 or the second node 1155 using the second beamforming direction. In one aspect, the reception component 1104 and/or the transmission component 1108 may be configured to communicate with the first node 1150 or the second node 1155 by communicating with the first node 1150 using the second beamforming direction and the second subarray. In another aspect, the reception component 1104 and/or the transmission component 1108 may be configured to communicate with the first node 1150 or the second node 1155 by communicate with the first node or a second node using the second beamforming direction by communicating with the second node using the second beamforming direction and the second subarray.

The apparatus may include additional components that perform each of the blocks of the algorithm in the aforementioned flowcharts of FIGS. 10A-10C. As such, each block in the aforementioned flowcharts of FIGS. 10A-10C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
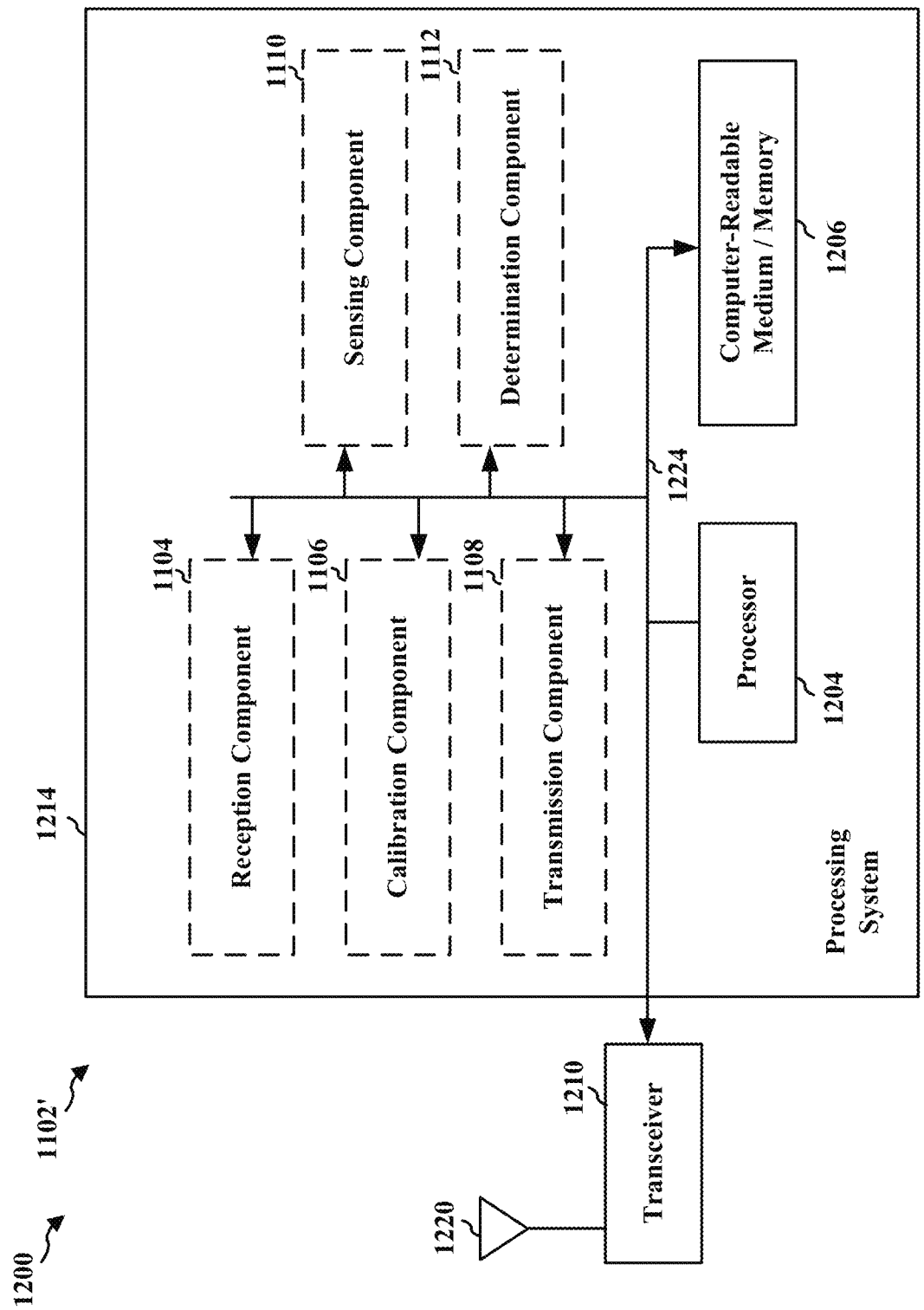
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described above for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication may include means for maintaining first information associated with a correlation between each of a plurality of wireless device orientations and at least one node, at least one subarray, and a corresponding beamforming direction. In another configuration, the apparatus 1102/1102' for wireless communication may include means for determining a first beamforming direction for use in communicating with a first node. In one aspect, the first beamforming direction may be determined based at least in part on an orientation of a first subarray at the wireless device and the first information. In a further configuration, the apparatus 1102/1102' for wireless communication may include means for determining the change in the orientation of the first subarray based at least in part on second information obtained from one or more sensors at the wireless device. In one aspect, the one or more sensors may include at least one gyroscope. In one aspect, the second information may be associated with geometric positions of the first subarray and the second subarray. In a further aspect, the change in the orientation of the first subarray may include an angle change in an angle between the first subarray and the first node. In one aspect, the change in the orientation of the first subarray further may include at least one of an elevation change in an elevation of the first subarray or a position change in a position of the first subarray with respect to an azimuth. In one configuration, the apparatus 1102/1102' for wireless communication may include means for determining a second subarray from a plurality of subarrays based at least in part on the first beamforming direction, the change in the orientation of the first subarray, and second information associated with the first subarray and the second subarray. In another configuration, the apparatus 1102/1102' for wireless communication may include means for determining a second beamforming direction based at least in part on the first beamforming direction, a change in the orientation of the first subarray, and the first information. In certain implementations, the second beamforming direction may be determined based at least in part on the first information and the angle change in the first angle between the first subarray and the first node. In one aspect, the second beamforming direction may also be determined based at least in part on the second information. In one aspect, the means for determining the second beamforming direction may be configured to determine a first signal strength associated with the first subarray, the first node, and the first beamforming direction.

In another aspect, the means for determining the second beamforming direction may be configured to determine a second signal strength associated with a second subarray, the second node, and a second beamforming direction. In another aspect, the means for determining the second beamforming direction may be configured to detect the change in the orientation of the first subarray. In a further aspect, the means for determining the second beamforming direction may be configured to determine that the first signal strength associated with the first subarray, the first node, and the first beamforming direction is less than a threshold value based on the change in the orientation of the first subarray and the first information. In one aspect, the means for determining the second beamforming direction may be configured to determine that the second signal strength associated with the second subarray, the second node, and the second beamforming direction is greater than or equal to the threshold value based at least in part on the change in the orientation of the first subarray and the first information. In another aspect, the means for determining the second beamforming direction may be configured to determine to communicate with the second node using the second subarray and the second beamforming direction based at least in part on one or more of the second information associated with the first subarray and the second subarray, the change in the orientation of the first subarray, the first signal strength, and the second signal strength. In one configuration, the apparatus 1102/1102' for wireless communication may include means for determining that a first signal strength between the first subarray and the first node is less than a threshold value when using the second beamforming direction. In another configuration, the apparatus 1102/1102' for wireless communication may include means for determining that a second signal strength between the second subarray and the first node is greater than or equal to the threshold value when using the second beamforming direction. In one aspect, the determining that the second signal strength between the second subarray and the first node is greater than or equal to the threshold value may be based at least in part on the first information and the second information. In a further configuration, the apparatus 1102/1102' for wireless communication may include means for communicating with the first node or a second node using the second beamforming direction. In one aspect, the means for communicating with the first node or a second node using the second beamforming direction may be configured to communicate with the first node using the second beamforming direction and the second subarray. In another aspect, the means for communicating with the first node or a second node using the second beamforming direction may be configured to communicate with the second node using the second beamforming direction and the second subarray. The aforementioned means may be one or more of the aforementioned components of the apparatus 1102 and/or the processing system 1214 of the apparatus 1102' configured to perform the functions recited by the aforementioned means. As described above, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13A:
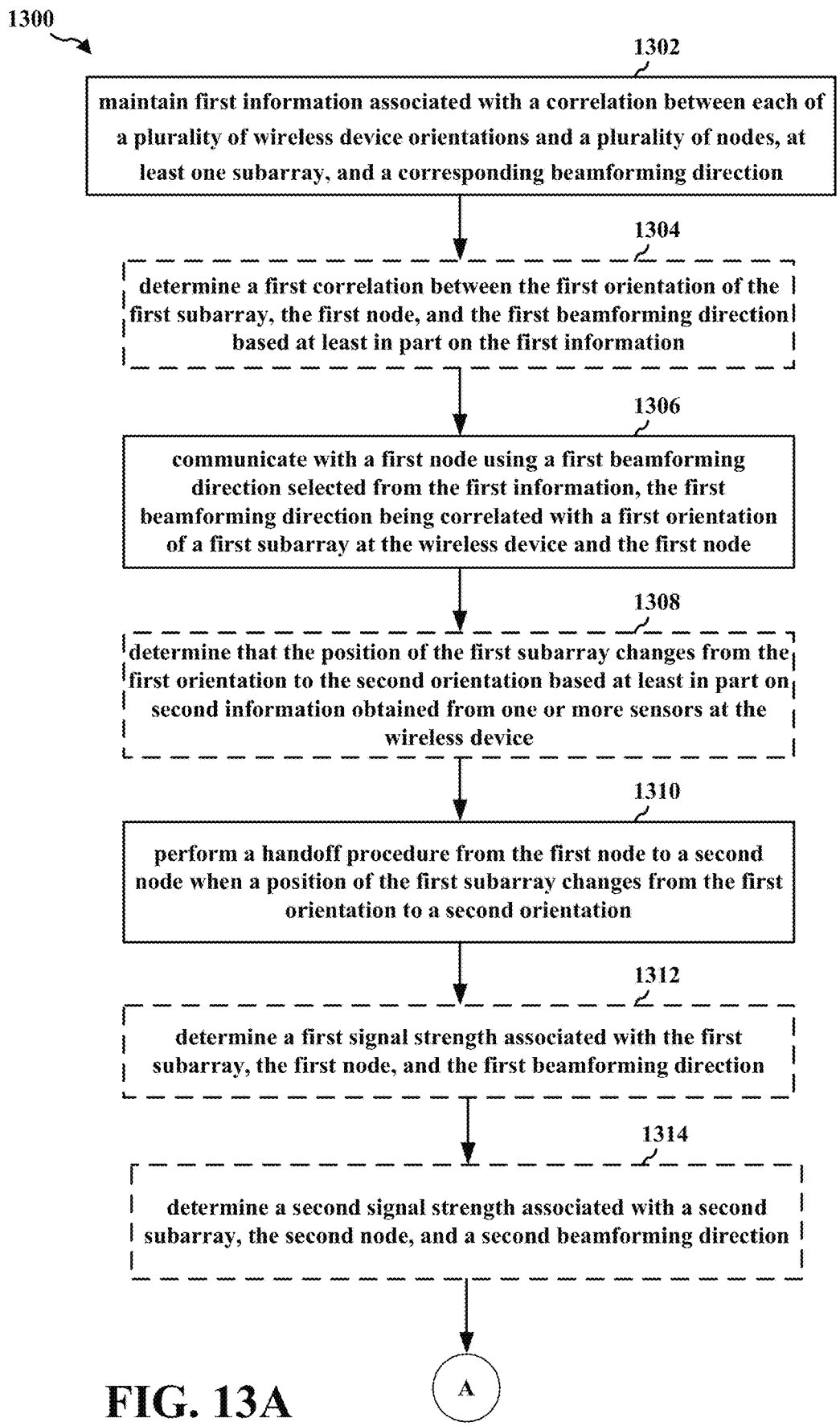
FIGS. 13A and 13B are a flowchart of a method of wireless communication.
Figure 13B:
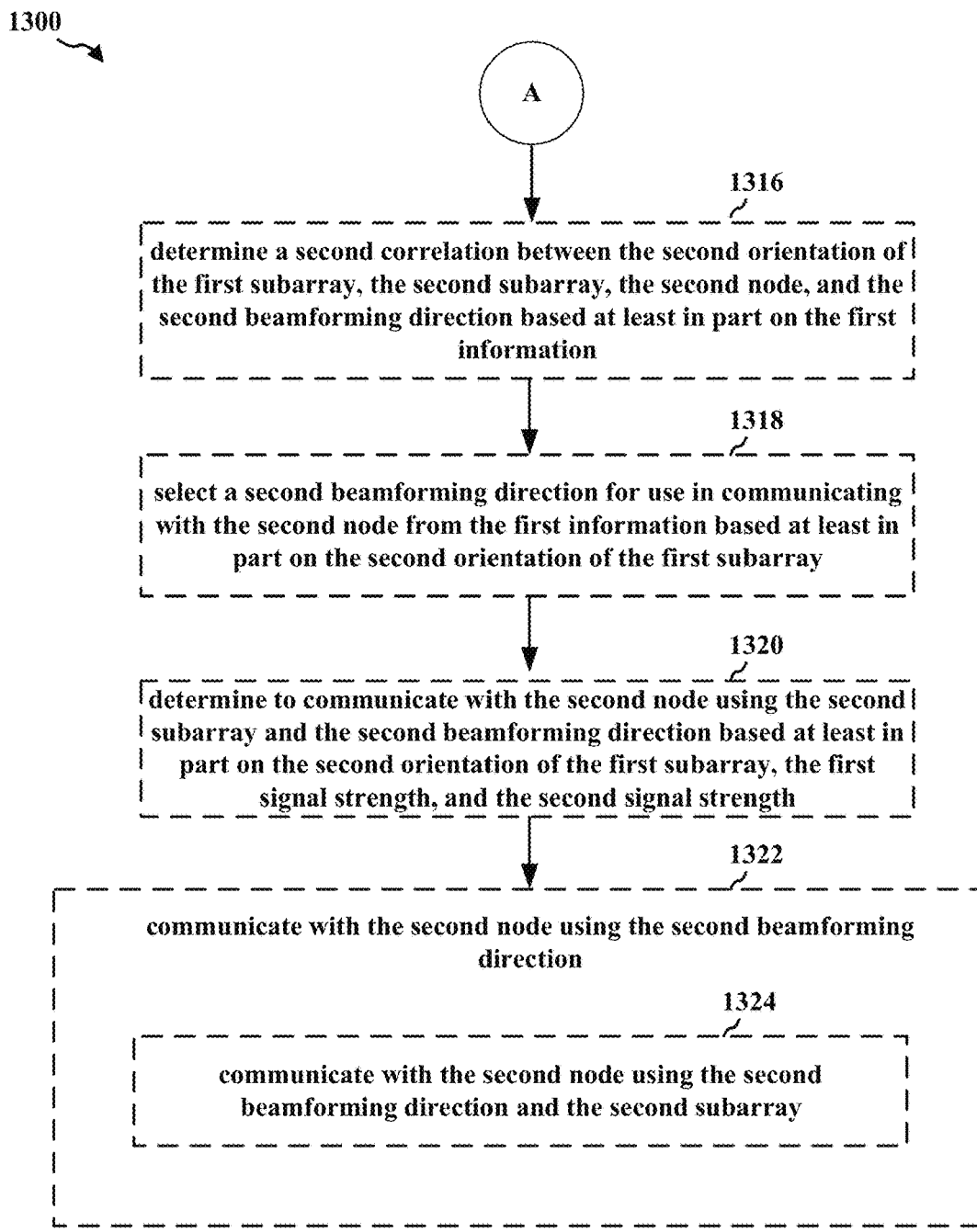

FIGS. 13A and 13B are a flowchart 1300 of a method of wireless communication. The method may be performed by a wireless device (e.g., the UE 104, 350, STA 152, wireless device 502, 602, 702, 802, 902 the apparatus 1102/1102', 1402/1402') in communication with a plurality of nodes (e.g., the base station 102, 180, 310, node 504, 506, 604, 606, 608, 704, 804, 904, 906, 1150, 1155, 1450, 1455). In FIGS. 13A and 13B, operations indicated with dashed lines may represent optional operations.

Referring to FIG. 13A, at 1302, the wireless device may maintain first information associated with a correlation between each of a plurality of wireless device orientations and a plurality of nodes, at least one subarray, and a corresponding beamforming direction. For example, referring to FIG. 5A, the wireless device 502 may maintain 505 first information (e.g., beamforming calibration information) associated with a correlation between each of a plurality of wireless device orientations, and at least one preferred node, at least one preferred subarray, and at least one preferred beamforming direction obtained during the beamforming procedure 501, 503. In one aspect, the first information (e.g., look-up-table of beamforming calibration information) may be maintained locally at the wireless device 502. In another configuration, the first information may be maintained externally to the wireless device 502, and accessed by the wireless device 502 using one of radio access technologies discussed above.

At 1304, the wireless device may determine a first correlation between the first orientation of the first subarray, the first node, and the first beamforming direction based at least in part on the first information. For example, referring to FIG. 9, the wireless device 902 may determine, at the first orientation 912a, that the second node 906 (e.g., the first node) is the preferred node. In addition, at the first orientation 912a, the wireless device 902 may determine that the second subarray 910b (e.g., the first subarray) is the preferred subarray. At the first orientation 912a, the wireless device 902 may also determine the preferred beamforming direction 901 (e.g., the first beamforming direction).

At 1306, the wireless device may communicate with a first node using a first beamforming direction selected from the first information. In certain aspects, the first beamforming direction may be correlated with a first orientation of a first subarray at the wireless device and the first node. For example, referring to FIG. 9, the wireless device 902 may communicate with the second node 906 using the beamforming direction 901 selected from the first information, the first beamforming direction may be correlated with a first orientation of a first subarray at the wireless device and the first node in the first information maintained by the wireless device 902 (e.g., see operation 505 described above in connection with FIG. 5A).

At 1308, the wireless device may determine that the position of the first subarray changes from the first orientation to the second orientation based at least in part on second information obtained from one or more sensors at the wireless device. In certain aspects, the one or more sensors may include at least one gyroscope. In certain other aspects, the second information may indicate a change in an angle between the first subarray and the first node. In certain other aspects, the second beamforming direction may be selected based at least in part on the first information and the second information. In certain other aspects, the second information may indicate an elevation change of the first subarray or an azimuthal change of the first subarray. For example, referring to FIG. 9, the wireless device 902 may determine that an orientation change (e.g., angle change 909 detected by a gyroscope) has occurred, which may trigger a beamforming, subarray, and node selection procedure.

At 1310, the wireless device may perform a handoff procedure from the first node to a second node when a position of the first subarray changes from the first orientation to a second orientation. For example, referring to FIG. 9, the wireless device 902 may perform a handoff procedure from the second node 906 to the first node 904 when the orientation (e.g., position) of the second subarray 910*b* changes from the first orientation 912*a* to the second orientation 912*b*.

At 1312, the wireless device may determine a first signal strength associated with the first subarray (e.g., the second subarray 910*b*), the first node (e.g., the second node 906), and the first beamforming direction (e.g., the first beamforming direction 901). For example, referring to FIG. 9, the wireless device 902 may determine the second beamforming direction by determining a first signal strength associated with the second subarray 910*b*, the second node 906, and the first beamforming direction 901 after the orientation change, e.g., based on a particular signal parameter (e.g., signal strength, QoS level, interference level, etc.) associated with the second subarray 910*b*, the second node 906, and the first beamforming direction 901.

At 1314, the wireless device may determine a second signal strength associated with a second subarray (e.g., the first subarray 910*a*), the second node (e.g., the first node 904), and a second beamforming direction (e.g., the second beamforming direction 903). For example, referring to FIG. 9, the wireless device 902 may determine the second beamforming direction by determining a second signal strength associated with the first subarray 910*a*, the first node 904, and a second beamforming direction 903 after the orientation change, e.g., based on a particular signal parameter (e.g., signal strength, QoS level, interference level, etc.) associated with the first subarray 910*a*, the first node 904, and a second beamforming direction 903.

Referring to FIG. 13B, at 1316, the wireless device may determine a second correlation between the second orientation of the first subarray, the second subarray, the second node, and the second beamforming direction based at least in part on the first information. For example, referring to FIG. 9, the wireless device 902 may determine that the second orientation 912*b* is correlated with communicating using the first node 904, the second beamforming direction 903, and the first subarray 910*a* based at least in part on the change in the orientation of the second subarray 910*b* and the first information (e.g., the information maintained at operation 505 in FIG. 5A).

At 1318, the wireless device may select a second beamforming direction for use in communicating with the second node from the first information based at least in part on the second orientation of the first subarray. For example, referring to FIG. 9, the wireless device 902 may select the second beamforming direction 903 for use in communicating with the first node 904 from the first information (e.g., the information maintained at operation 505 in FIG. 5A) based at least in part on the second orientation 912*b* of the second subarray 910*b*.

At 1320, the wireless device may determine to communicate with the second node using the second subarray and the second beamforming direction based at least in part on the second orientation of the first subarray, the first signal strength, and the second signal strength. For example, referring to FIG. 9, the wireless device 902 may determine to communicate with the first node 904 using the first subarray 910*a* and the second beamforming direction 903 by determining a first signal strength associated with the second subarray 910*b*, the second node 906, and the first beamforming direction 901 after the orientation change, e.g., based on a particular signal parameter (e.g., signal strength, QoS level, interference level, etc.) associated with the second subarray 910*b*, the second node 906, and the first beamforming direction 901. The wireless device 902 may compare the determined first signal strength to the threshold value to determine that the first signal strength is less than the threshold value, and hence, determine to communicate with the first node 904 using the first subarray 910*a* and the second beamforming direction 903 after the orientation change.

At 1322, the wireless device may communicate with the second node using the second beamforming direction. For example, referring to FIG. 9, the wireless device 902 may communicate with the first node 904 using the first subarray 910*a* and the second beamforming direction 903 after the orientation change.

At 1324, the wireless device may communicate with the second node using the second beamforming direction by communicating with the second node using the second beamforming direction and the second subarray. For example, referring to FIG. 9, the wireless device 902 may communicate with the first node 904 using the first subarray 910*a* and the second beamforming direction 903 after the orientation change.

Figure 14:
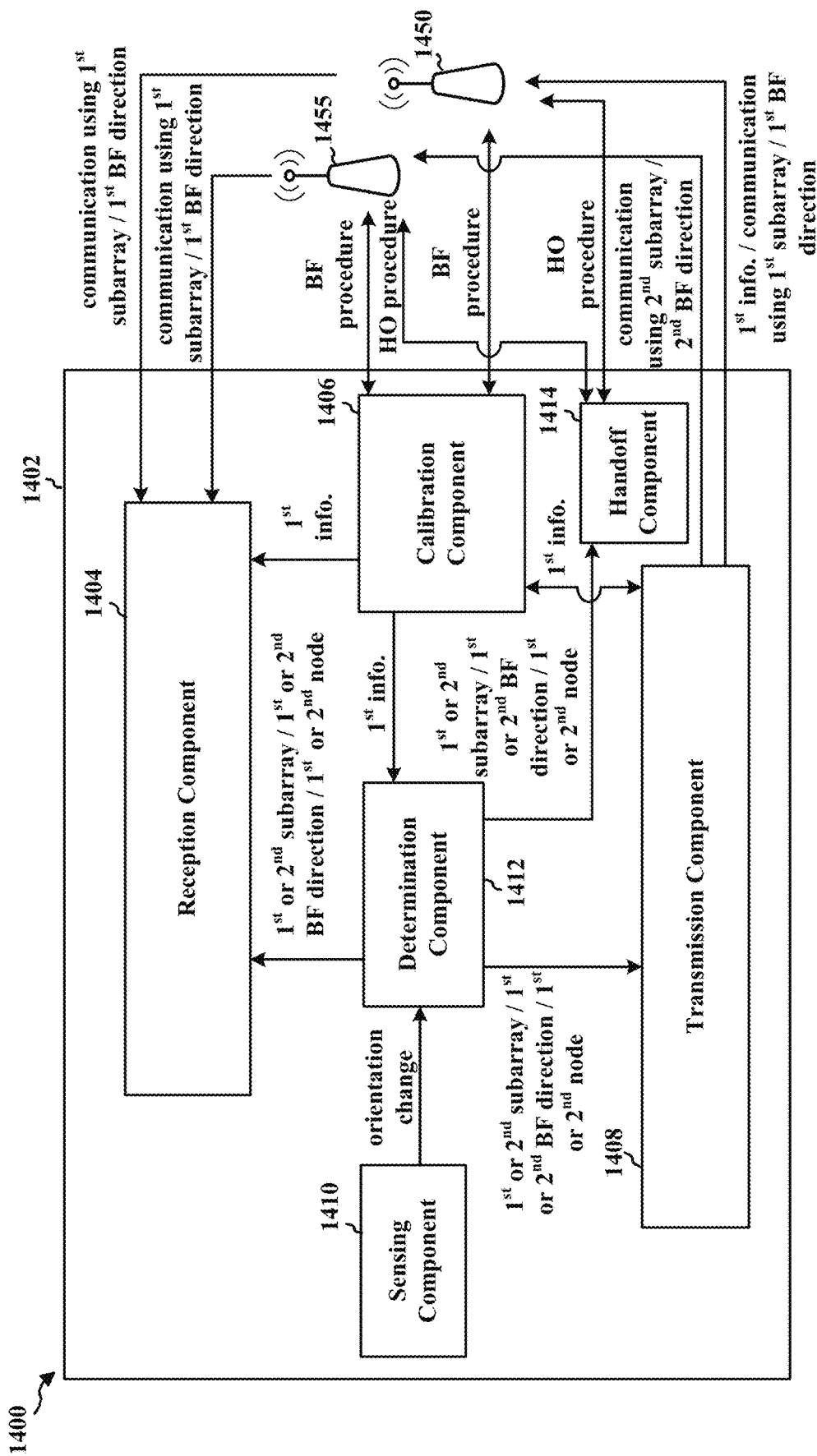
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a wireless device (e.g., the UE 104, 350, STA 152, wireless device 502, 602, 702, 802, 902 the apparatus 1102/1102', 1402/1402') in communication with a first node 1150 (e.g., the base station 102, 180, 310, node 504, 506, 604, 606, 608, 704, 804, 904, 906, 1450, 1455) and a second node 1155 (e.g., the base station 102, 180, 310, node 504, 506, 604, 606, 608, 704, 804, 904, 906, 1450, 1455). The apparatus may include a reception component 1404, a calibration component 1406, a transmission component 1408, a sensing component 1410, a determination component 1412, and a handoff component 1414.

The calibration component 1406 may be configured to perform a beamforming procedure with the first node 1450 and the second node 1455. In addition, the calibration component 1406 may be configured to determine a preferred node, a preferred subarray, and a preferred beamforming direction for each of a plurality of different wireless device orientations. The calibration component 1406 may also be configured to may maintain first information associated with a correlation between each of a plurality of wireless device orientations and a plurality of nodes, at least one subarray, and a corresponding beamforming direction. The calibration component 1406 may be configured to send a signal associated with the first information to one or more of the reception component 1404, the transmission component 1408, and/or the determination component 1412.

The determination component 1412 may be configured to determine a first correlation between the first orientation of the first subarray, the first node 1450, and the first beamforming direction based at least in part on the first information when the apparatus is in a first orientation. The determination component 1412 may be configured to send a signal associated with the first correlation to one or more of the reception component 1404 and/or the transmission component 1408.

One or more of the reception component 1404 and/or the transmission component 1408 may be configured to communicate with the first node 1450 using a first beamforming direction selected from the first information. In certain aspects, the first beamforming direction may be correlated with a first orientation of a first subarray at the wireless device and the first node.

The sensing component 1410 may be configured to determine that the position of the first subarray changes from the first orientation to the second orientation based at least in part on second information obtained from one or more sensors at the wireless device. In certain aspects, the one or more sensors may include at least one gyroscope. In certain other aspects, the second information may indicate a change in an angle between the first subarray and the first node. In certain other aspects, the second beamforming direction may be selected based at least in part on the first information and the second information. In certain other aspects, the second information may indicate an elevation change of the first subarray or an azimuthal change of the first subarray. The sensing component 1410 may be configured to send a signal associated with the orientation change to the determination component 1412.

The determination component 1412 may be configured to determine a first signal strength associated with the first subarray, the first node 1450, and the first beamforming direction. The determination component 1412 may be configured to determine a second signal strength associated with a second subarray, the second node, and a second beamforming direction. The determination component 1412 may be configured to determine a second correlation between the second orientation of the first subarray, the second subarray, the second node 1455, and the second beamforming direction based at least in part on the first information. The determination component 1412 may be configured to determine to communicate with the second node using the second subarray and the second beamforming direction based at least in part on the second orientation of the first subarray, the first signal strength, and the second signal strength. The determination component may be configured to send a signal instructing the handoff component 1414 to perform a handoff procedure based at least in part on the determined second correlation, first signal strength, and/or second signal strength.

The handoff component 1414 may be configured to perform a handoff procedure from the first node 1450 to the second node 1455 when a position of the first subarray changes from the first orientation to a second orientation.

One or more of the reception component 1404 and/or the transmission component 1408 may be configured to communicate with the second node using the second beamforming direction. In certain aspects, the one or more of the reception component 1404 and/or the transmission component 1408 may be configured to communicate with the second node using the second beamforming direction by communicating with the second node using the second beamforming direction by communicating with the second node using the second beamforming direction and the second subarray.

The apparatus may include additional components that perform each of the blocks of the algorithm in the aforementioned flowcharts of FIGS. 13A and 13B. As such, each block in the aforementioned flowcharts of FIGS. 13A and 13B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
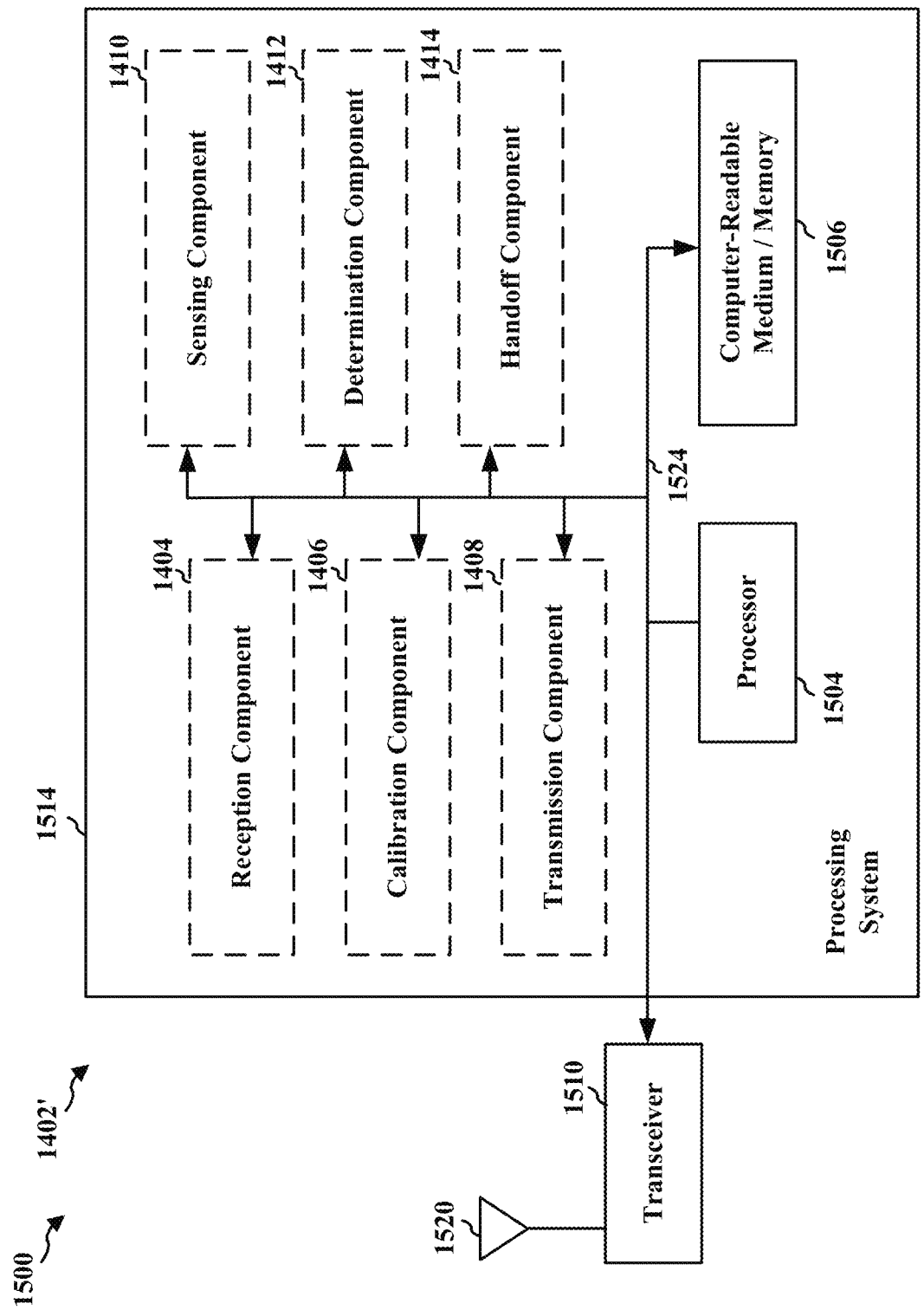
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1408, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described above for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In certain configurations, the apparatus 1402/1402' for wireless communication may include means for maintaining first information associated with a correlation between each of a plurality of wireless device orientations and a plurality of nodes, at least one subarray, and a corresponding beamforming direction. In certain other configurations, the apparatus 1402/1402' for wireless communication may include means for determining a first correlation between the first orientation of the first subarray, the first node, and the first beamforming direction based at least in part on the first information. In certain other configurations, the apparatus 1402/1402' for wireless communication may include means for communicating with a first node using a first beamforming direction selected from the first information. In certain aspects, the first beamforming direction may be correlated with a first orientation of a first subarray at the wireless device and the first node. In certain other configurations, the apparatus 1402/1402' for wireless communication may include means for determining that the position of the first subarray changes from the first orientation to the second orientation based at least in part on second information obtained from one or more sensors at the wireless device. In certain aspects, the one or more sensors may include at least one gyroscope. In certain other aspects, the second information may indicate a change in an angle between the first subarray and the first node. In certain other aspects, the second beamforming direction may be selected based at least in part on the first information and the second information. In certain other aspects, the second information may indicate an elevation change of the first subarray or an azimuthal change of the first subarray. In certain other configurations, the apparatus 1402/1402' for wireless communication may include means for performing a handoff procedure from the first node to a second node when a position of the first subarray changes from the first orientation to a second orientation. In certain other configurations, the apparatus 1402/1402' for wireless communication may include means for determining a first signal strength associated with the first subarray, the first node, and the first beamforming direction. In certain other configurations, the apparatus 1402/1402' for wireless communication may include means for determining a second signal strength associated with a second subarray, the second node, and a second beamforming direction. In certain other configurations, the apparatus 1402/1402' for wireless communication may include means for determining a second correlation between the second orientation of the first subarray, the second subarray, the second node, and the second beamforming direction based at least in part on the first information. In certain other configurations, the apparatus 1402/1402' for wireless communication may include means for selecting a second beamforming direction for use in communicating with the second node from the first information based at least in part on the second orientation of the first subarray. In certain other configurations, the apparatus 1402/1402' for wireless communication may include means for determining to communicate with the second node using the second subarray and the second beamforming direction based at least in part on the second orientation of the first subarray, the first signal strength, and the second signal strength. In certain other configurations, the apparatus 1402/1402' for wireless communication may include means for communicating with the second node using the second beamforming direction. In certain aspects, the means for communicating with the second node using the second beamforming direction may be configured to communicate with the second node using the second beamforming direction and the second subarray. The aforementioned means may be one or more of the aforementioned components of the apparatus 1402 and/or the processing system 1514 of the apparatus 1402' configured to perform the functions recited by the aforementioned means. As described above, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a wireless device, comprising:
 performing a beamforming procedure with each of a plurality of nodes before entering an operational mode to begin communicating with at least one of the plurality of nodes;
 maintaining first information associated with a correlation between
  each of a plurality of wireless device orientations and the plurality of nodes, at least one subarray, and a corresponding beamforming direction based on the beamforming procedure performed with each of the plurality of nodes;
 communicating, after entering the operational mode, with a first node using a first beamforming direction selected from the first information, the first beamforming direction being correlated with a first orientation of a first subarray at the wireless device and the first node; and
 when a position of the first subarray changes from the first orientation to a second orientation, performing a handoff procedure from the first node to a second node of the plurality of nodes based on the first information maintained by the wireless device and without performing an additional scanning procedure to discover the second node while in the operational mode.

2. The method of claim 1, further comprising:
selecting a second beamforming direction for use in communicating with the second node from the first information based at least in part on the second orientation of the first subarray; and
communicating with the second node using the second beamforming direction.

3. The method of claim 2, further comprising:
determining a first signal strength associated with the first subarray, the first node, and the first beamforming direction;
determining a second signal strength associated with a second subarray, the second node, and the second beamforming direction;
determining to communicate with the second node using the second subarray and the second beamforming direction based at least in part on the second orientation of the first subarray, the first signal strength, and the second signal strength,
wherein the communicating with the second node using the second beamforming direction comprises communicating with the second node using the second beamforming direction and the second subarray.

4. The method of claim 3, further comprising:
determining a first correlation between the first orientation of the first subarray, the first node, and the first beamforming direction based at least in part on the first information; and
determining a second correlation between the second orientation of the first subarray, the second subarray, the second node, and the second beamforming direction based at least in part on the first information,
wherein the determining to communicate with the second node using the second subarray and the second beamforming direction is further based on the second correlation.

5. The method of claim 2, further comprising:
determining that the position of the first subarray changes from the first orientation to the second orientation based at least in part on second information obtained from one or more sensors at the wireless device.

6. The method of claim 5, wherein the one or more sensors include at least one gyroscope.

7. The method of claim 5, wherein the second information indicates a change in an angle between the first subarray and the first node.

8. The method of claim 7, wherein the second beamforming direction is selected based at least in part on the first information and the second information.

9. The method of claim 5, wherein the second information indicates an elevation change of the first subarray or an azimuthal change of the first subarray.

10. An apparatus for wireless communication for a wireless device, comprising:
means for performing a beamforming procedure with each of a plurality of nodes before entering an operational mode to begin communicating with at least one of the plurality of nodes;
means for maintaining first information associated with a correlation between
each of a plurality of wireless device orientations and the plurality of nodes, at least one subarray, and a corresponding beamforming direction based on the beamforming procedure performed with each of the plurality of nodes;
means for communicating, after entering the operational mode, with a first node using a first beamforming direction selected from the first information, the first beamforming direction being correlated with a first orientation of a first subarray at the wireless device and the first node; and
means for performing a handoff procedure from the first node to a second node of the plurality of nodes based on the first information maintained by the wireless device and without performing an additional scanning procedure to discover the second node, the performing of the handoff procedure from the first node to the second node when a position of the first subarray changes from the first orientation to a second orientation while in the operational mode.

11. The apparatus of claim 10, further comprising:
means for selecting a second beamforming direction for use in communicating with the second node from the first information based at least in part on the second orientation of the first sub array; and
means for communicating with the second node using the second beamforming direction.

12. The apparatus of claim 11, further comprising:
means for determining a first signal strength associated with the first subarray, the first node, and the first beamforming direction;
means for determining a second signal strength associated with a second subarray, the second node, and the second beamforming direction;
means for determining to communicate with the second node using the second subarray and the second beamforming direction based at least in part on the second orientation of the first subarray, the first signal strength, and the second signal strength,
wherein the means for communicating with the second node using the second beamforming direction is configured to communicate with the second node using the second beamforming direction and the second subarray.

13. The apparatus of claim 12, further comprising:
means for determining a first correlation between the first orientation of the first subarray, the first node, and the first beamforming direction based at least in part on the first information; and
means for determining a second correlation between the second orientation of the first subarray, the second subarray, the second node, and the second beamforming direction based at least in part on the first information,
wherein the means for determining to communicate with the second node using the second subarray and the second beamforming direction is further configured to determine to communicate with the second node based on the second correlation.

14. The apparatus of claim 11, further comprising:
means for determining that the position of the first subarray changes from the first orientation to the second orientation based at least in part on second information obtained from one or more sensors at the wireless device.

15. The apparatus of claim 14, wherein the one or more sensors include at least one gyroscope.

16. The apparatus of claim 14, wherein the second information indicates a change in an angle between the first subarray and the first node.

17. The apparatus of claim 16, wherein the second beamforming direction is selected based at least in part on the first information and the second information.

18. The apparatus of claim 14, wherein the second information indicates an elevation change of the first subarray or an azimuthal change of the first subarray.

19. An apparatus for wireless communication for a wireless device, comprising:
a memory; and
at least one processor coupled to the memory and configured to:
perform a beamforming procedure with each of a plurality of nodes before entering an operational mode to begin communicating with at least one of the plurality of nodes;
maintain first information associated with a correlation between
each of a plurality of wireless device orientations and the plurality of nodes, at least one subarray, and a corresponding beamforming direction based on the beamforming procedure performed with each of the plurality nodes;
communicate, after entering the operational mode, with a first node using a first beamforming direction selected from the first information, the first beamforming direction being correlated with a first orientation of a first subarray at the wireless device and the first node; and
when a position of the first subarray changes from the first orientation to a second orientation, perform a handoff procedure from the first node to a second node of the plurality of nodes based on the first information maintained by the wireless device and without performing an additional scanning procedure to discover the second node while in the operational mode.

20. The apparatus of claim 19, wherein the at least one processor is further configured to:
select a second beamforming direction for use in communicating with the second node from the first information based at least in part on the second orientation of the first subarray; and
communicate with the second node using the second beamforming direction.

21. The apparatus of claim 20, wherein the at least one processor is further configured to:
determine a first signal strength associated with the first subarray, the first node, and the first beamforming direction;
determine a second signal strength associated with a second subarray, the second node, and the second beamforming direction;
determine to communicate with the second node using the second subarray and the second beamforming direction based at least in part on the second orientation of the first subarray, the first signal strength, and the second signal strength,
wherein the wherein the at least one processor is configured to communicate with the second node using the second beamforming direction by communicating with the second node using the second beamforming direction and the second subarray.

22. The apparatus of claim 21, wherein the at least one processor is further configured to:
determine a first correlation between the first orientation of the first subarray, the first node, and the first beamforming direction based at least in part on the first information; and
determine a second correlation between the second orientation of the first subarray, the second subarray, the second node, and the second beamforming direction based at least in part on the first information,
wherein the at least one processor is configured to determine to communicate with the second node using the second subarray and the second beamforming direction based on the second correlation.

23. The apparatus of claim 20, wherein the at least one processor is further configured to:
determine that the position of the first subarray changes from the first orientation to the second orientation based at least in part on second information obtained from one or more sensors at the wireless device.

24. The apparatus of claim 23, wherein the one or more sensors include at least one gyroscope.

25. The apparatus of claim 23, wherein the second information indicates a change in an angle between the first subarray and the first node.

26. The apparatus of claim 25, wherein the second beamforming direction is selected based at least in part on the first information and the second information.

27. The apparatus of claim 23, wherein the second information indicates an elevation change of the first subarray or an azimuthal change of the first subarray.

28. A computer-readable medium storing computer executable code for a wireless device, comprising code to:
perform a beamforming procedure with each of a plurality of nodes before entering an operational mode to begin communicating with at least one of the plurality of nodes;
maintain first information associated with a correlation between
each of a plurality of wireless device orientations and the plurality of nodes, at least one subarray, and a corresponding beamforming direction based on the beamforming procedure performed with each of the plurality of nodes;
communicate, after entering the operational mode, with a first node using a first beamforming direction selected from the first information, the first beamforming direction being correlated with a first orientation of a first subarray at the wireless device and the first node; and
when a position of the first subarray changes from the first orientation to a second orientation, perform a handoff procedure from the first node to a second node of the plurality of nodes based on the first information maintained by the wireless device and without performing an additional scanning procedure to discover the second node while in the operational mode.

29. The computer-readable medium of claim 28, further comprising code to:
select a second beamforming direction for use in communicating with the second node from the first information based at least in part on the second orientation of the first subarray; and
communicate with the second node using the second beamforming direction.

30. The computer-readable medium of claim 29, further comprising code to:
determine a first signal strength associated with the first subarray, the first node, and the first beamforming direction;
determine a second signal strength associated with a second subarray, the second node, and the second beamforming direction;
determine to communicate with the second node using the second subarray and the second beamforming direction based at least in part on the second orientation of the first subarray, the first signal strength, and the second signal strength,
wherein the code to communicate with the second node using the second beamforming direction is configured to communicate with the second node using the second beamforming direction and the second subarray.

* * * * *